(12) United States Patent
Berard et al.

(10) Patent No.: US 10,252,494 B2
(45) Date of Patent: Apr. 9, 2019

(54) LUMINOUS GLAZING UNIT WITH OPTICAL ISOLATOR AND MANUFACTURE THEREOF

(71) Applicant: SAINT-GOBAIN GLASS FRANCE, Courbevoie (FR)

(72) Inventors: Matthieu Berard, Paris (FR); Brice Dubost, Paris (FR); Stéphanie Morlens, Paris (FR); Mauricette Rondet, Vitry sur Seine (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 331 days.

(21) Appl. No.: 15/109,172

(22) PCT Filed: Dec. 23, 2014

(86) PCT No.: PCT/FR2014/053529
§ 371 (c)(1),
(2) Date: Jun. 30, 2016

(87) PCT Pub. No.: WO2015/101745
PCT Pub. Date: Jul. 9, 2015

(65) Prior Publication Data
US 2016/0325528 A1    Nov. 10, 2016

(30) Foreign Application Priority Data

Dec. 31, 2013 (FR) .................................. 13 63762

(51) Int. Cl.
| | | |
|---|---|---|
| G06K 7/10 | (2006.01) | |
| G06K 7/14 | (2006.01) | |
| B32B 17/10 | (2006.01) | |
| F21V 33/00 | (2006.01) | |
| F21V 8/00 | (2006.01) | |
| F21Y 115/10 | (2016.01) | |

(52) U.S. Cl.
CPC .. *B32B 17/10036* (2013.01); *B32B 17/10201* (2013.01); *B32B 17/10339* (2013.01);
(Continued)

(58) Field of Classification Search
CPC ........ B32B 17/10036; B32B 17/10761; B32B 17/10541; B32B 17/10339;
(Continued)

(56) References Cited

U.S. PATENT DOCUMENTS

2007/0114523 A1\*   5/2007  Oumi .................... B82Y 20/00
                                                                257/40
2012/0043532 A1\*   2/2012  Yasuda ................. B82Y 20/00
                                                                257/40
(Continued)

FOREIGN PATENT DOCUMENTS

| EP | 0 132 198 A1 | 1/1985 |
|---|---|---|
| EP | 0 823 653 A1 | 2/1998 |

(Continued)

OTHER PUBLICATIONS

International Search Report as issued in International Patent Application No. PCT/FR2014/053529, dated Mar. 19, 2015.

*Primary Examiner* — Thien T Mai
(74) *Attorney, Agent, or Firm* — Pillsbury Winthrop Shaw Pittman LLP

(57) ABSTRACT

A luminous glazing unit includes a first glass substrate, made of mineral glass and in optical contact with a second glass substrate, a polymer layer, selected from a lamination interlayer, associated with a tinted and/or reflective element, and/or an opaque polymer encapsulation, a porous silica layer, underneath the polymer layer, a light source, optically coupled to the first glass substrate, and a light-extracting device associated with the first glass substrate, a mineral and transparent protective coating made of silica, directly on the porous silica layer and directly underneath the polymer layer.

19 Claims, 5 Drawing Sheets

Figure 1:
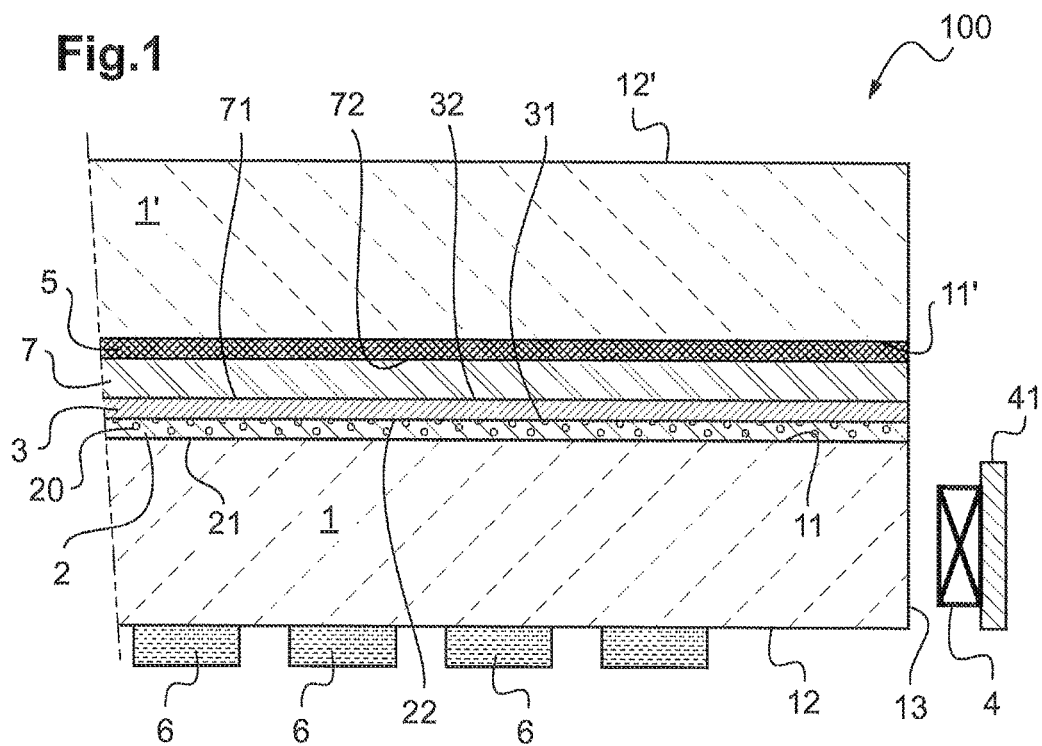

(52) U.S. Cl.
CPC .. *B32B 17/10541* (2013.01); *B32B 17/10761* (2013.01); *F21V 33/006* (2013.01); *G02B 6/0033* (2013.01); *G02B 6/0065* (2013.01); *G02B 6/0068* (2013.01); *F21Y 2115/10* (2016.08)

(58) Field of Classification Search
CPC ............ B32B 17/10201; F21V 33/006; F21Y 2115/10; G02B 6/0068; G02B 6/0033; G02B 6/0065
See application file for complete search history.

(56) References Cited

U.S. PATENT DOCUMENTS

2012/0257281 A1* 10/2012 Takagi .................. G02B 5/0221
                                                                   359/599
2016/0325528 A1* 11/2016 Berard ................. G02B 6/0065

FOREIGN PATENT DOCUMENTS

| | | |
|---|---|---|
| EP | 0 825 478 A1 | 2/1998 |
| EP | 0 964 288 A2 | 12/1999 |
| EP | 1 329 433 A1 | 7/2003 |
| EP | 2 423 173 A1 | 2/2012 |
| FR | 2 987 043 A1 | 8/2013 |
| FR | 2 989 176 A1 | 10/2013 |
| WO | WO 01/90787 A1 | 11/2001 |
| WO | WO 03/007060 A1 | 1/2003 |
| WO | WO 2004/030935 A2 | 4/2004 |
| WO | WO 2005/018283 A1 | 2/2005 |
| WO | WO 2008/059170 A2 | 5/2008 |
| WO | WO 2008/059171 A2 | 5/2008 |
| WO | WO 2009/081077 A2 | 7/2009 |
| WO | WO 2012/028809 A1 | 2/2012 |
| WO | WO 2012/035258 A1 | 3/2012 |
| WO | WO 2012/172269 A1 | 12/2012 |
| WO | WO 2013/054041 A1 | 4/2013 |
| WO | WO 2013/167832 A1 | 11/2013 |

* cited by examiner

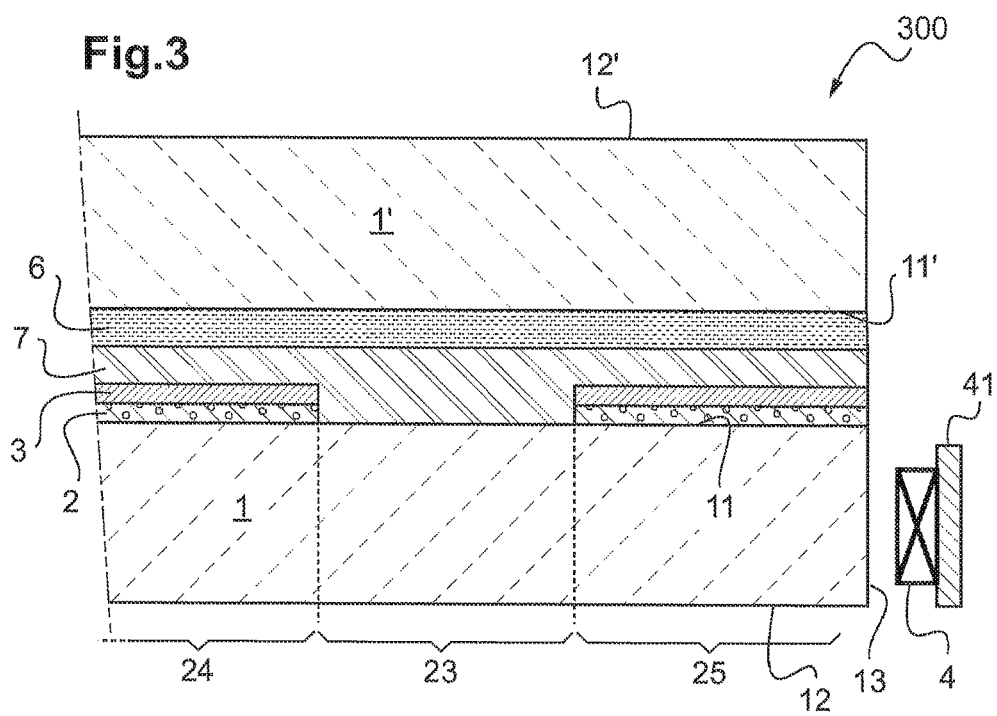
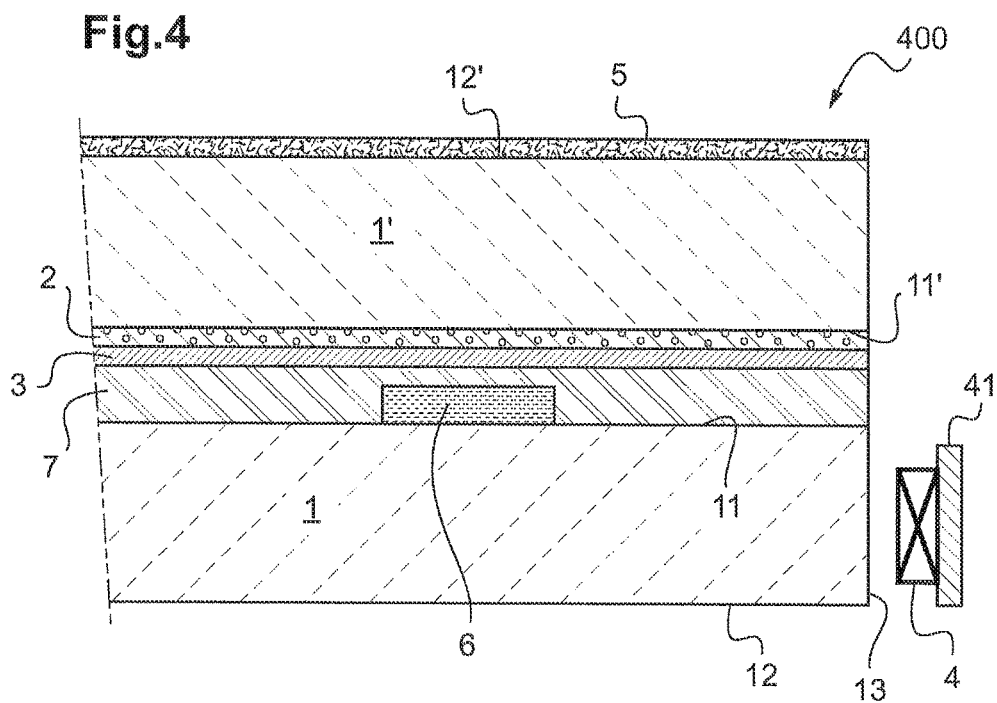

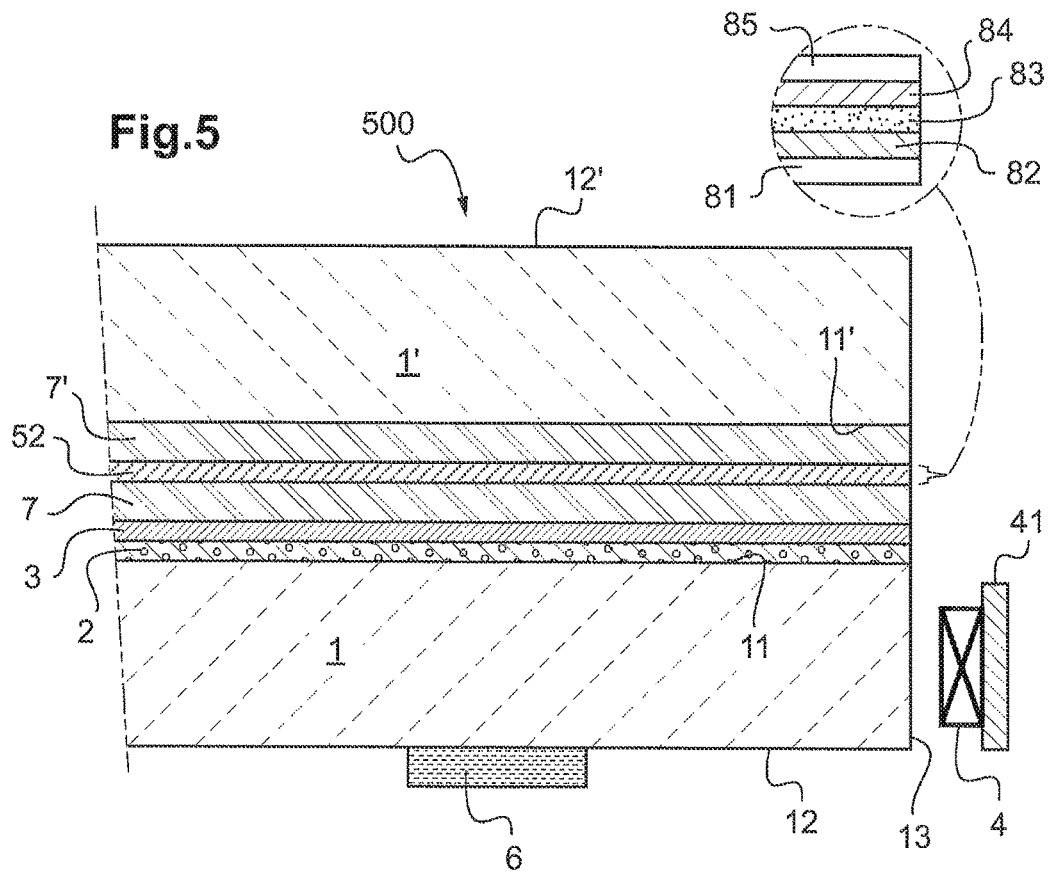
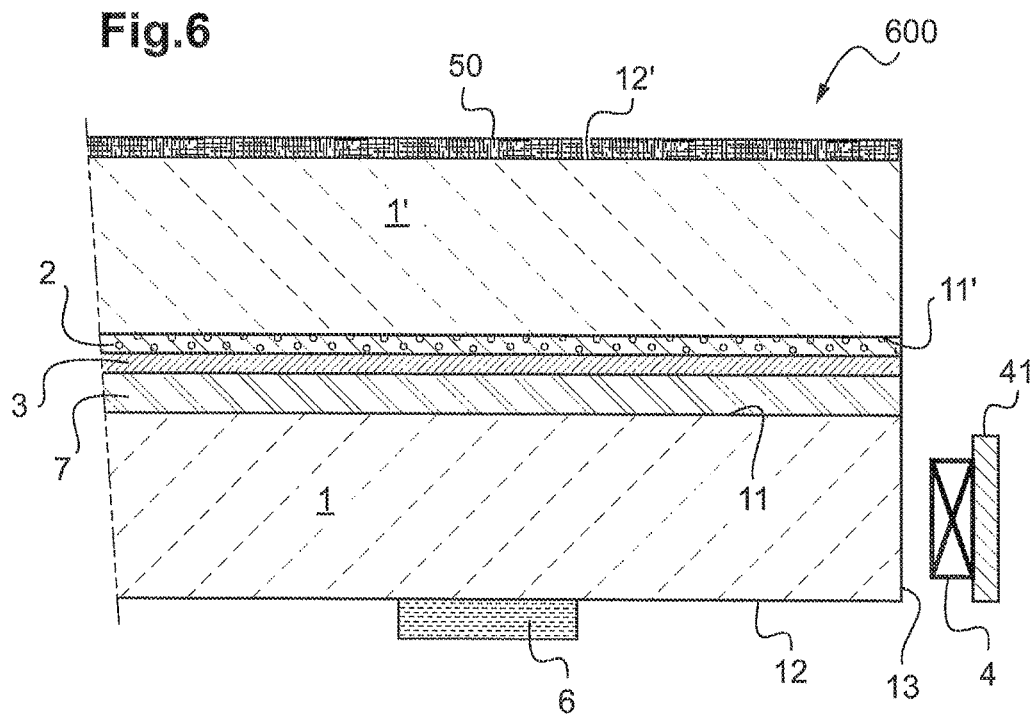

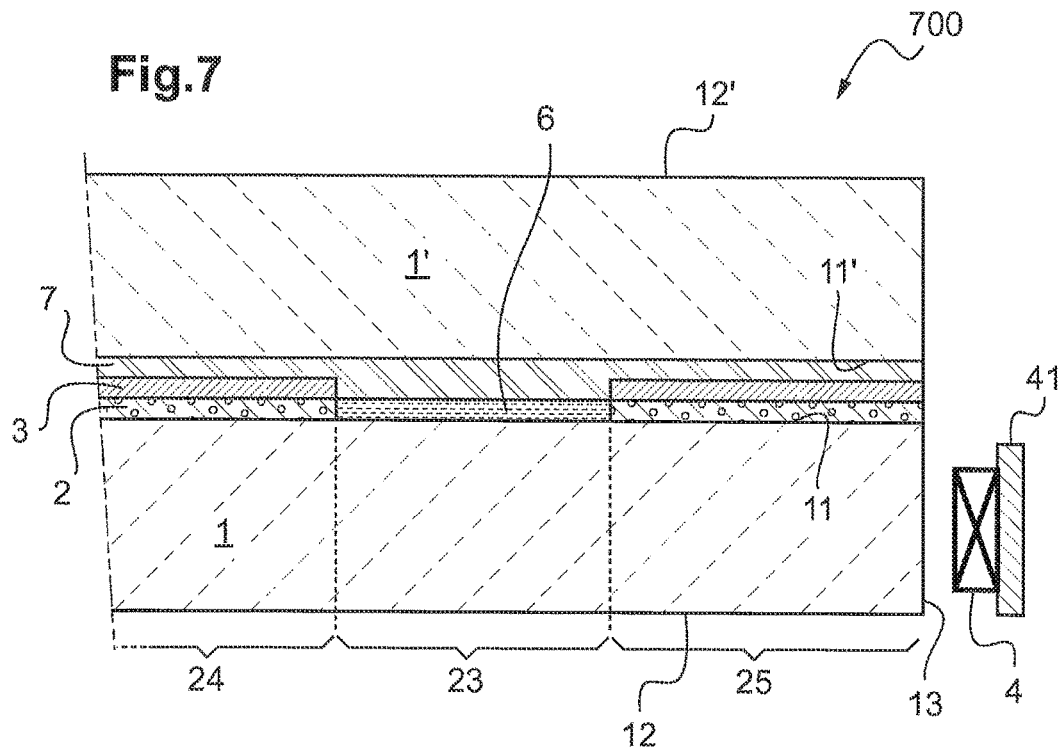
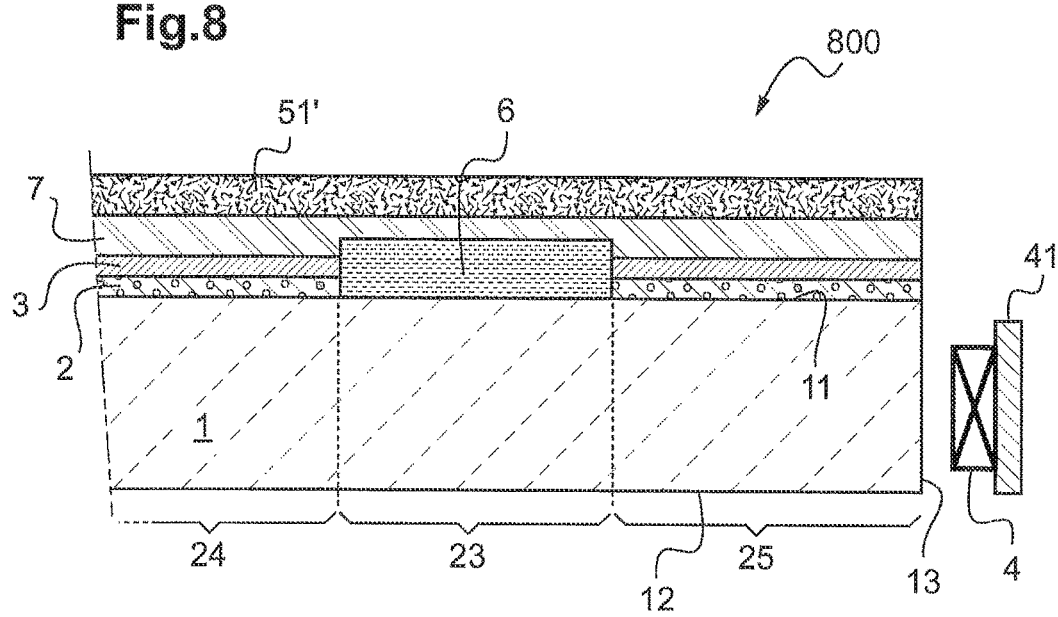

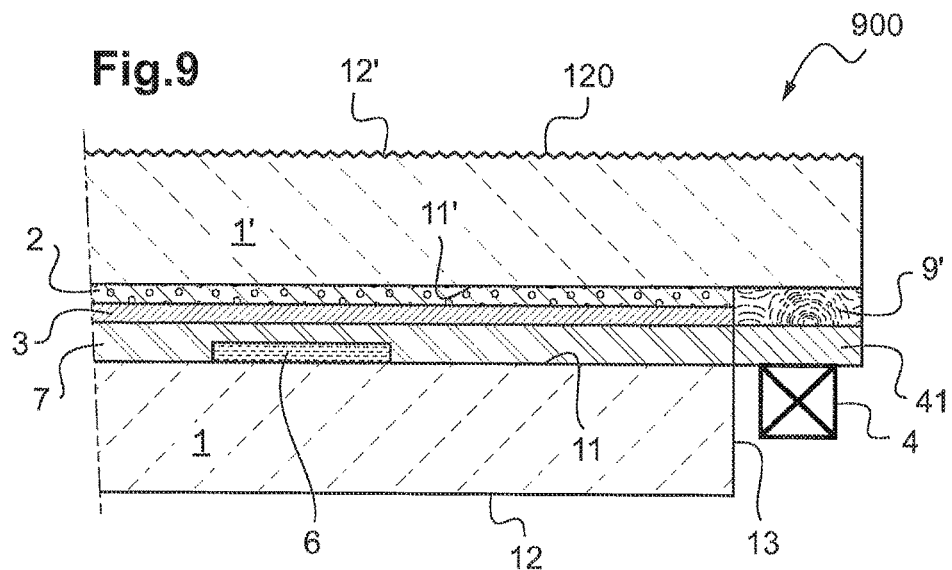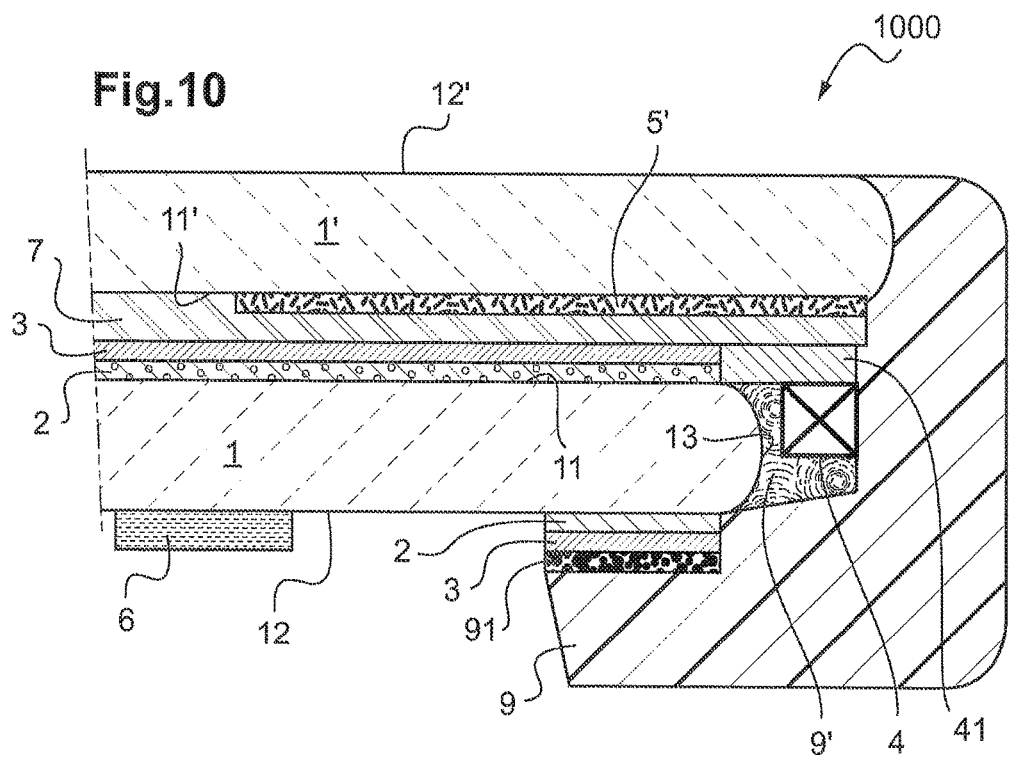

LUMINOUS GLAZING UNIT WITH OPTICAL ISOLATOR AND MANUFACTURE THEREOF

CROSS-REFERENCE TO RELATED APPLICATIONS

This application is the U.S. National Stage of PCT/FR2014/053529, filed Dec. 23, 2014, which in turn claims priority to French Application No. 1363762, filed Dec. 31, 2013. The contents of all of these applications are incorporated herein by reference in their entirety.

The present invention relates to the field of lighting and more particularly relates to a luminous glazing unit with optical isolator and the manufacture thereof.

It is known to form a luminous glazing unit by illuminating a glass pane via the edge face with LEDs. The light thus injected is guided by total internal reflection inside this glass pane by virtue of the contrast in index with the surrounding materials. This light is then extracted with the aid of scattering features.

Document WO 2008/059170 proposes, in connection with FIG. 11, an edge-lit luminous roof 1" comprising:
- a first glass pane, of optical index $n1$ equal to around 1.5, for example a clear or extra-clear glass sheet,
- a bulk-tinted glass pane,
- a lamination interlayer, between the first and second glass panes, for example a polyvinylbutyral interlayer,
- a discontinuous porous silica sol-gel layer forming an optical separator, deposited on the first glass pane, the layer having an optical index $n2$ equal to 1.1 and a thickness of 400 nm,
- an illumination source for illumination via the edge face of the first substrate, in the form of light-emitting diodes preferably housed in a groove of the first glass pane 1,
- an internal backscattering network between the porous layer and the first substrate, in the form of features of suitable dimensions, depending on the desired illumination.

However, this solution is not robust enough or at the very least its efficiency is not optimal, and it is desired better still to control the extraction of light at one or more well-defined points, for example that are well distributed over the surface of the glass.

In order to overcome these drawbacks, the invention proposes, as a first subject, a luminous glazing unit comprising:
- a first glass substrate, made of mineral (transparent, clear, extra-clear) glass having a refractive index $n1$ of less than 1.65 at 550 nm and even of less than 1.6, better still in the whole of the visible spectrum, and even less than 1.55, or better still less than 1.5, in particular from 1.45 to 1,55, with first and second main faces and an edge face, and, in optical contact with the first glass substrate:
  - a polymer layer, in optical contact with the first glass substrate, selected from at least one of the following elements:
    - a lamination interlayer, made of thermoplastic material, associated with a tinted and/or scattering and/or reflective element (mirror, two-way mirror) and/or
    - an opaque polymer encapsulation or a polymer encapsulation primer, in particular that is opaque, underneath an opaque polymer encapsulation,
- an optical isolator on the first glass substrate (in particular directly, at least outside of zone(s) with light-extracting means) and underneath the polymer layer, the isolator comprising (better consists of) a porous silica layer having a thickness $e2$ of at least 400 nm and preferably of at most 1.5 µm, better of at least 600 nm, having a refractive index $n2$ at 550 nm (better in the whole of the visible spectrum) of at most 1.35, preferably of at most 1.25 and even of less than 1.2,
- a (visible) light source, preferably an array of light-emitting diodes (aligned, in particular in row(s)) or an extracting optical fiber, optically coupled to the first glass substrate, preferably by the edge face, referred to as the coupling edge face, or as a variant optically coupled to one of the main faces (in particular with a hole for housing diodes), the first glass substrate, referred to as a guiding glass pane, guiding the light emitted by the light source,
- preferably light-extracting means (for extracting light resulting from the guidance) associated with the guiding glass pane (optionally sold separately or in a luminous glazing unit in kit form and/or added by the user)—in particular scattering means on the side of the first main face and/or on the side of (even preferably on) the second main face and/or in the bulk of the guiding glass pane—the light-extracting means optionally forming a light concentrator.

The optional polymer encapsulation and encapsulation primer is additionally preferably facing the edge face, in particular without disturbing said optical coupling (in particular further from the coupling edge face than the light source).

The luminous glazing unit additionally comprises a mineral and transparent protective coating directly on the porous silica layer and directly underneath the polymer layer. The protective coating comprises (even consists of) a silica layer with a thickness $e3$ of greater than 50 nm and a refractive index $n3$ of at least 1.4 at 550 nm and even of at least 1.42, better still of at least 1.44.

Here it is the guiding glass pane which is coated with the optical isolator.

The lamination interlayer may be tinted and/or laminated with a second tinted glass substrate, made of mineral or organic glass and/or that bears a tinted film on the lamination interlayer side or main face opposite the lamination.

The lamination interlayer may be laminated with a second glass substrate, made of mineral or organic glass, a second substrate with a main face referred to as a bonding face linked to the lamination interlayer, the bonding face coated with a decorative and/or masking layer, in particular an enamel and/or a paint (lacquer) or a reflective layer, which is peripheral and on the side of the optical coupling (frame), or distributed and even substantially covering the bonding face.

Underneath the paint (lacquer) there may be a preferably transparent adhesion primer.

Alternatively, it is possible to have:
- the following sequence: guiding glass pane/optical isolator/protective coating/lamination interlayer (PVB) with decorative paint or ink (/second (transparent, tinted) glass substrate),
- the following sequence: guiding glass pane/optical isolator/protective coating/lamination interlayer/a decorative element (film with decorative paint, etc.)/other (transparent, tinted) lamination interlayer/second (transparent, tinted) glass substrate).

A laminated lacquered glazing unit with an optional adhesion primer sublayer is described in document WO 2009/081077. In order to optimize the adhesion between the paint and an optional polymer lamination interlayer sheet, the paint is preferably subjected to the action of a plasma, in particular via a corona discharge treatment, before heat treatment. For the same purpose, it is also possible to deposit silanes on the paint, for example by spraying or wiping. These treatments make it possible to use paints, especially lacquers, the adhesion of which with the polymer interlayer sheets is naturally weak. Nevertheless, they generate an additional cost and are not therefore preferred.

The lamination interlayer may be laminated with a second glass substrate made of mineral glass (preferably) or organic glass, a second substrate with a main face referred to as a bonding face linked to the lamination interlayer, the bonding face or the opposite face comprises a scattering layer (deposition, element, especially plastic element, added especially adhesively bonded with an optical adhesive) and/or said second substrate is scattering and/or else a scattering element is between the protective coating and the lamination interlayer in particular partially covering the protective coating or in other words partially between the protective coating and the interlayer, leaving lamination interlayer and protective coating in contact in one or more zones.

It is possible to have:
- the following sequence: guiding glass pane/optical isolator/protective coating/lamination interlayer (PVB) with scattering paint or ink (on the main face of the interlayer opposite the main face on the protective coating side)/second (transparent or tinted) glass substrate,
- or the following sequence: guiding glass pane/optical isolator/protective coating/lamination interlayer/a scattering element (film with paint, etc.)/other lamination interlayer/second (transparent or tinted) glass substrate.
  - A scattering element is conventionally a surface texturing having a height of between 100 nm and 100 μm, preferably of micrometer scale, or a matrix with scattering particles. It may alternatively be a liquid crystal system as described later on.

If the guiding glass pane is laminated via the interlayer, its main face linked to the interlayer is referred to as the inner face and the opposite main face is referred to as the outer face.

Another subject of the invention is a luminous glazing unit comprising:
- a glass substrate, made of mineral (transparent, clear, extra-clear) glass or organic glass, having a refractive index n1 of less than 1.65 at 550 nm, even of less than 1.6, in particular from 1.45 to 1.55, better in the whole of the visible spectrum, with main faces and an edge face, laminated via a main face referred to as a linking face to another glass substrate, via a lamination interlayer made of thermoplastic material (that is transparent, clear, extra-clear, scattering forming part of the extracting means),
  - the other glass substrate, made of mineral glass with a first main face referred to as a lamination face, second glass substrate tinted and/or scattering and/or bears a tinted and/or scattering and/or reflective element on the main face opposite the lamination face,
- an optical isolator directly on the lamination face, in particular directly, at least outside of zone(s) with light-extracting means and underneath the interlayer, the isolator comprising (better consisting of) a porous silica layer having a thickness e2 of at least 400 nm and preferably of at most 1.5 μm, better of at least 600 nm, having a refractive index n2 at 550 nm (better in the whole of the visible spectrum) of at most 1.35, preferably of at most 1.25 and even of less than 1.2, the other glass substrate being referred to as isolated substrate,
- a (visible) light source, preferably an array of light-emitting diodes (aligned, in particular in row(s)) or an extracting optical fiber, optically coupled to the first glass substrate, preferably via the edge face, referred to as the coupling edge face, or as a variant optically coupled to one of the main faces (in particular with a hole for housing diodes), the first glass substrate, referred to as guiding substrate, guiding the light emitted by the source,
- preferably light-extracting means (for extracting light resulting from the guidance) associated with the guiding substrate (optionally sold separately or in a luminous glazing unit in kit form and/or added by the user)—in particular scattering means on the lamination side and/or on the opposite side (even preferably on the exterior face) and/or in the bulk of the guiding substrate—light-extracting means optionally forming a light concentrator.

This luminous glazing unit additionally comprises a mineral and transparent protective coating directly on the porous silica layer and directly underneath the lamination interlayer. The protective coating comprises (even consists of) a silica layer with a thickness e3 of greater than 50 nm and a refractive index n3 of at least 1.4 at 550 nm and even of at least 1.42, better still of at least 1.44.

Here it is the isolated substrate, distinct from the guiding substrate, which is coated with the optical isolator.

This luminous glazing unit may also comprise, if the guiding substrate is mineral on the main face referred to as the exterior face, opposite the linking face, at the periphery:
- another optical isolator directly on the lamination face, the isolator comprising a porous silica layer having a thickness e2 of at least 400 nm and preferably of at most 1.5 μm, better of at least 600 nm, having a refractive index n2 at 550 nm (better in the whole of the visible spectrum) of at most 1.35, preferably of at most 1.25 and even of less than 1.2, the other glass substrate being referred to as isolated substrate, preferably identical to said optical isolator,
- another mineral and transparent protective coating, directly on the porous silica layer, preferably identical to said protective coating (nature or even same thickness) in particular which comprises (even consists of) a silica layer with a thickness e3 of greater than 50 nm and a refractive index n3 of at least 1.4 at 550 nm and even of at least 1.42, better still of at least 1.44, an opaque polymer encapsulation or a polymer encapsulation primer, in particular that is opaque, underneath an opaque polymer encapsulation, at the periphery and preferably facing the edge face of the guiding substrate.

The Applicant has observed that when the lamination interlayer is applied directly to the porous silica layer (to the guiding glass pane or the isolated substrate), its function as an optical isolator is lost.

It is probable that the pores of the porous layer, in particular the open pores on its surface, are polluted in the course of manufacture and that the pollutants remain trapped in the pores even after a heat treatment (lamination heat treatment).

The Applicant has also observed that when a polymer encapsulation primer or a polymer encapsulation is applied directly to the porous silica layer, its function as an optical isolator is reduced.

In the absence of an optical isolator, the optical losses are particularly significant when a tinted element has a $T_L$ of less than 85% in particular for a (reference) thickness of 4 mm or even 2 mm. $T_L$ is measured in a conventional manner according to the EN410 standard with a D65 illuminant and a spectrophotometer.

Even a reflective element, in particular a specular element, in particular a silvered mirror or a two-way mirror, may advantageously be optically isolated for better guidance. Examples of layers that form a two-way mirror are described in patent WO 2012/035258.

The protective coating preferably covers the entire surface of the porous silica layer, for simplicity even, where appropriate, in one or more areas without the polymer layer.

Advantageously, the thickness e3 is at least 80 nm or at least 100 nm and better still at least 180 nm. And n3 is at least 1.42, even at least 1.44.

The (dense) silica layer may preferably be submicronic and even at most 500 nm.

The choice of n3 reveals that the protective coating is dense. It is free of through-pores (having a size equal to e3 or of the order of e3, i.e. size/e3 between 1 and 2) and it may even be considered that it is essentially free of pores, at the very least with a volume fraction of less than 10%, better still less than 5%.

The dense silica layer preferably comprises an (essentially) continuous solid phase rather than a solid phase mainly taking the form of (nano)particles or crystallites.

A dense silica layer (especially one not intentionally made porous) conventionally has a refractive index at 550 nm of about 1.45 if deposited by physical vapor deposition, and between 1.42 and 1.46 if obtained by the sol-gel process.

During trials, the Applicant observed that with a thickness of less than 50 nm the barrier to pollutants of the porous silica layer was insufficient.

In the case of lamination in particular, the optical losses are reduced gradually beyond 50 nm. Starting from 80 nm a good improvement in the guidance is observed, at 120 nm a further improved guidance is observed and at 230 nm excellent guidance is observed.

Selecting a silica-based protective coating is the simplest solution while still being efficient. In one alternative, the protective coating could comprise, better still consist of, a nitride, an oxide, or an oxynitride preferably of one of the following elements: Ti, Zr, Al, or else of one of the following elements W, Sb, Hf, Ta, V, Mg, Mn, Co, Ni, Sn, Zn, Ce. This may be a sol-gel layer or a layer deposited by a physical or chemical process. The thickness e3 of the protective coating should be adjusted, so that it fulfils its protective role, as a function of its nature and, indirectly, as a function of its density.

Preferably, the polymer layer is in contact with the protective coating over its entire surface. Preferably, in particular, no element is inserted between the lamination face of the isolated substrate (or the inner face of the guiding glass pane) and the protective coating, or at the very least a layer deposited on the polymer layer or on the protective coating is preferably excluded.

The first glass substrate (guiding glass pane), porous silica layer and protective coating assembly may have a light transmission $T_L$ of at least 80% and even of at least 90%, in particular for a (reference) glass thickness of 4 mm or even 2 mm.

The transparency of the protective coating makes it possible in particular to preserve the view through the luminous glazing unit or else the tint conferred by the tinted element.

The transparency of the protective coating makes it possible in particular to preserve the view of a decorative element, for example a paint (in particular a lacquer) in particular on the second glass substrate or the isolated substrate (and/or of an enamel on the second glass substrate or the isolated substrate, enamel or paint (lacquer) distributed over a surface of the second glass substrate (bonding face or opposite face) or of the isolated substrate (face opposite the lamination face), substantially covering this surface or as discrete features or else as a border (lateral and/or longitudinal bands, frame).

The transparency is taken here in the broad sense, implying vision through, it being possible for the protective coating to be colorless or tinted, of neutral color or bright color. The protective coating may even be adjusted as a function of the tint of the tinted element, in particular second glass substrate or the isolated substrate and/or of the lamination interlayer which is itself tinted for additional color, in the embodiment with the guiding glass pane. The protective coating may for example be adjusted as a function of the color of the paint and/or of the enamel used for decorative purposes, for additional color.

The paint or the enamel is generally opaque but may alternatively let more light pass through for example when applied as a thin layer and/or by adjusting the content of fillers in the binder.

The protective coating may be tinted by nature (of the matrix) and/or for example by addition of coloring additives, and may contain as a metal colloid, metal oxide colloid or metal salt colloid. As a colored silica sol-gel, mention may be made of the examples from document WO 2013/054041.

For simplicity, a protective coating without additives or fillers, or more broadly without (nano)particles, may be preferred.

The transparency of the protective coating may make it possible to apply it directly in a given zone (or several zones) on the linking face or the lamination face if the optical isolator is discontinuous. Then, preferably, the protective coating is selected with a refractive index n3 at 550 nm (better still in the whole of the visible spectrum) such that the difference n3−n1, optionally as an absolute value (in particular with n3>n1), is less than 0.1, better still at most 0.05.

If the extracting means are above the lamination interlayer, further from the guiding substrate, the lamination interlayer may preferably have a refractive index n'3 at 550 nm (better still in the whole of the visible spectrum) such that the difference n'3−n1, optionally as an absolute value (in particular with n'3>n1), is less than 0.1, better still at most 0.05.

If the optical isolator is discontinuous and the extracting means are above the lamination interlayer, further from the guiding glass pane, the lamination interlayer may preferably have a refractive index n'3 at 550 nm (better still in the whole of the visible spectrum) such that the difference n'3−n1, optionally as an absolute value (in particular with n'3>n1), is less than 0.1, better still at most 0.05.

The outer face of the guiding glass pane opposite the inner face or the exterior face opposite the linking face may be coated at the periphery with the polymer encapsulation or the encapsulation primer and polymer encapsulation.

In the case of the encapsulation primer and/or encapsulation, the transparency of the protective coating is not essential, however it may be desired to use the same coating as for the lamination interlayer in the case of a laminated glazing unit, for simplification. However, the luminous glazing unit with a polymer encapsulation may optionally be monolithic (with a single mineral unlaminated glass pane).

However, in many applications, the lamination is required, lamination with a glass substrate made of preferably mineral glass, for example for a laminated glazed partition, a laminated glazed entrance door, a laminated vehicle glazing unit (roof, windshield and even side window).

Between the guiding glass pane and a second glass substrate, said lamination interlayer may be:
transparent, in particular clear or extra-clear
or scattering (in its volume rather than surface texturing) or may bear a scattering layer for example an ink, a printed layer, for example that is local, and that is part of or forms the extracting means if the optical isolator is discontinuous.

The second (flexible, rigid or semi-rigid) glass substrate made of mineral glass may be clear, extra-clear or even scattering or may bear a scattering element (deposit, added film) for example on the other side of its bonding face with the interlayer.

Between the guiding substrate and the other glass substrate, said lamination interlayer may be:
transparent, in particular preferably clear or extra-clear, (optionally slightly tinted)
or scattering (by volume rather than surface texturing) or may bear a scattering layer for example an ink, a printed layer, for example that is local, and that is part of or forms the extracting means.

For a motor vehicle glazing unit, the second glass substrate, made of mineral glass, is preferably tinted (in particular for a motor vehicle roof) and better still the lamination interlayer is also tinted or the isolated substrate is tinted (in particular for a motor vehicle roof). The thickness of the glass substrates is preferably at most 3 mm. A table 1 hereinbelow gives examples of glass sold by the Applicant. They are suitable for all the glazing units of a vehicle, whether they are tempered or laminated. The SGS THERMOCONTROL® Absorbing/Venus glass improves the thermal comfort by absorbing the energy charge in the bulk of the glass. These types of glass are divided into two categories: "Vision" (light transmission>70%) and "Privacy" (light transmission<70%).

TABLE 1

| Type of glass | $T_L$ (%) | $T_E$ (%) | Eff (%) |
|---|---|---|---|
| SGS THERMOCONTROL ® Venus Green 55 | 49 | 27 | 7 |
| Green-tinted high-performance//Clear glass | 28 | 16 | 3 |
| SGS THERMOCONTROL ® Venus Green 35 | 35 | 22 | 5 |
| SGS THERMOCONTROL ® Venus Grey 10 | 10 | 8 | 1 |
| SGS THERMOCONTROL ® Absorbing TSA3+ | 71 | 44 | 18 |
| Standard green glass | 78 | 53 | 25 |

The "Vision" glass is suitable for all types of glazing in the vehicle: green/blue/gray and ensures a reduced energy transmission ($T_E$). The most popular color for this purpose is green. It has been chosen due to its neutral appearance which does not affect the harmony of the colors of a vehicle.

The "Privacy" glass is glazing that is bulk-tinted for thermal comfort and privacy. It is glazing that is supertinted dark green or dark gray. In order to ensure privacy, this glazing has light transmission values that are below 70%, generally around 55% or less. Due to its dark tint, this type of glass also ensures a low UV transmission (UV rays may cause skin irritation).

In most countries, Venus/Privacy glass is suitable for the rear side windows (after the B-pillar), rear window and roof. The only exception is the United States, where supertinted glazing is prohibited on light vehicles (except sunroof) and, consequently, they are only used on utility vehicles (after the B-pillar). The application to sunroofs is accepted worldwide, irrespective of the type of vehicle.

Current European legislation requires a minimum light transmission of 75% for windshields and of 70% for the front doors.

SGS THERMOCONTROL® Venus consists of dark gray or dark green supertinted glazing. It has all the thermal advantages of "Vision" (SGS THERMOCONTROL® Type) glass with improved solar protection:
lower energy transmission values (compared to all other glass solutions),
its dark color also blocks UV radiation, which is responsible for skin irritation and discoloration of the passenger compartment,
offers greater privacy for the vehicle's passengers (it is difficult to see through the glass from the outside).

As a lamination interlayer, in particular having a thickness of at most 1.3 mm, or even that is submillimetric, in particular 0.38 mm or 0.76 mm, a sheet (or several sheets) of thermoplastic material, for example made of polyvinyl butyral (PVB), made of ethylene vinyl acetate (EVA) or made of polyurethane (PU), may be chosen.

Mention may be made of the products named Saflex® from the company Solutia.

The luminous glazing unit may comprise an electrically controllable system having variable optical properties, in particular having liquid crystals or having a light valve, which is electrochromic, and even thermochromic or thermotropic, between the guiding substrate and the protective coating, in particular partially covering the protective coating (in other words partially between the protective coating and the interlayer, leaving lamination interlayer and protective coating in contact in one or more zones) or further from the guiding glass pane than the optical isolator.

In a laminated glazing unit according to the invention, it is possible to have the following system: said lamination interlayer/support (plastic film)/first electrode/electrically controllable optical system/second electrode/support (plastic film)/another lamination interlayer/second glass substrate or isolated substrate. As support, a poly(ethylene terephthalate), referred to as PET, may be chosen.

As electrically controllable optical system, liquid crystals, an (SPD) light valve or an electrochrome may be preferred.

The liquid crystal electrically controllable optical system may occupy all or part of the surface of the luminous glazing unit. It may optionally be part of or form the light-extracting means.

Mention may be made of the liquid crystals described in applications EP 964 288, EP 0 823 653 A1, EP 0 825 478 A1, EP 0 964 288 A3 and EP 1 405 131.

The second glass substrate (laminated by the interlayer) may also be made of organic glass, in particular that is flexible, such as:
a poly(ethylene terephthalate) (PET) preferably laminated with PVB or EVA, functional (tinted, scattering) PET,
or a polyester optionally with a "hard" layer such as a siloxane,
or else a thermosetting PU laminated with a thermoplastic PU interlayer as described in document EP 132 198.

The second glass substrate may also be made of (rigid, semi-rigid) organic glass such as a polymethyl methacrylate (PMMA) or a polycarbonate (PC).

The guiding substrate (laminated by the interlayer) may also be made of organic glass, in particular that is flexible (rigid, semi-rigid), such as a polymethyl methacrylate (PMMA) or a polycarbonate (PC).

The luminous glazing unit, preferably laminated (with mineral or organic glass) in particular with said lamination interlayer forming an organic layer, may be part of a double or triple glazing unit, such as a window of a building or vehicle (train, etc.) or a door of a building or vehicle (train, etc.). It is preferred in this case to leave a transparent zone over most of the luminous glazing unit, in particular a central (clear glass) zone with optional (local) extracting feature(s). It is also preferred to place the luminous glazing on the interior side of the building or vehicle.

The luminous glazing unit may even be part of a double glazing unit of a door of refrigerated equipment, in particular that is vertical. It is preferred in this case to leave a transparent zone over most of the luminous glazing unit (clear glass) with optional (local) extracting feature(s). The luminous glazing unit may be the outermost glazing of the equipment.

The face opposite the lamination face or the bonding face may be free, or at least accessible and/or be used for the assembly.

The porous silica layer may be a compact stack of silica nanoparticles, for example obtained by the sol-gel process, or preferably a silica layer comprising a silica matrix (also referred to as a silica array) containing pores and preferably obtained by the sol-gel process. Very particularly, a porous layer comprising an (essentially) continuous solid phase, thus forming dense pore walls, is preferred to a solid phase mainly taking the form of (nano)particles or crystallites.

There are various pore-forming agents that may be used to manufacture the porous sol-gel layer. Thus, document EP 1 329 433 discloses a porous silica layer produced from a tetraethoxysilane (TEOS) sol hydrolyzed in an acid medium with a pore-forming agent based on polyethylene glycol tert-octyle phenyl ether (referred to as Triton) at a concentration between 5 and 50 g/l. The combustion of this pore-forming agent at 500° C. liberates the pores. This non-localized pore-forming agent is of indeterminate form and spreads uncontrollably through the structure.

Other pore-forming agents are known, such as micelles of cationic surfactant molecules in solution, and optionally in hydrolyzed form, or micelles of anionic or nonionic surfactants, or of amphiphilic molecules, for example block copolymers. Such agents generate pores in the form of narrow channels or relatively round pores of small size between 2 and 5 nm.

Preferably, a porous silica layer is obtained with a particular pore-forming agent, such as polymer beads, that for its part makes it possible to obtain better control of the size of the pores, especially allowing large pore sizes to be obtained, better control of the organization of the pores, especially allowing a uniform distribution to be obtained, and also better control of the number of pores in the layer and better reproducibility. The polymer beads may have a polymer core and a mineral shell.

The smallest characteristic dimension of the pores may even more preferably be greater than or equal to 30 nm and preferably less than 120 nm, better still less than 100 nm. Furthermore, also preferably, the largest characteristic dimension of the pores may even more preferably be greater than or equal to 30 nm and preferably less than 120 nm, better still less than 100 nm.

The aspect ratio, the largest dimension divided by the smallest dimension, may be less than 2 and even less than 1.5.

In one preferred embodiment, the porous silica layer is a silica matrix with closed pores (preferably bounded by the walls of the silica) in its volume, and in particular an open porosity on its surface, the closed pores, which especially have a substantially oval or substantially spherical shape, each having a smallest dimension of at least 30 nm and a largest dimension of at most 120 nm and preferably between 75 nm and 100 nm (preferably limits included), with e3 being greater than the largest dimension of the pores and preferably being submicronic.

The porous layer containing closed pores in its volume is mechanically stable, it does not collapse even for high pore concentrations. The pores may easily be separated from one another, clearly individualized.

The pores may be elongate, especially shaped like a grain of rice. Even more preferably, the pores may have a substantially spherical or oval shape. Preferably, most of the closed pores, even at least 80% thereof, have a given substantially identical, especially elongate, substantially spherical or oval shape.

Most (even between 80% or even 95% or even all) of the closed pores may preferably have a smallest characteristic dimension, and preferably also a largest dimension, of between 75 and 100 nm (preferably limits included).

In the porous layer, the pores may be of different sizes, even though this is not preferred.

The porosity may furthermore be monodisperse in size, the pore size then being set at a minimum value of 30 nm, preferably 40 nm and even more preferably 50 nm, and preferably less than 120 nm.

The proportion of pores by volume may preferably be greater than 50% and even greater than 65% and preferably less than 85%.

However, it will be noted that the maximum volume fraction of 74% is the maximum theoretical value applied to a stack of spheres of identical size, whatever it may be.

The guiding glass pane or the isolated substrate with the sol-gel layer and the protective (preferably sol-gel) coating may have been given a heat treatment at a temperature greater than or equal to 450° C., preferably greater than or equal to 600° C., and is especially even a tempered glass pane or tempered curved glass pane.

Preferably, for simplicity, the porous silica layer is a sol-gel layer and the protective coating comprises, better still consists of, a silica layer obtained by a sol-gel process rather than physical vapor deposition PVD, in particular magnetron sputtering, of the silica (or other oxide) layer which are more expensive and longer due to the electrically insulating nature of the silica and which complicate the manufacture.

The porous silica and/or the silica of the protective coating may be a mineral/organic hybrid. The porous silica and/or the silica of the protective coating may be doped. The dopant elements may preferably be chosen from Al, Zr, B, Sn, Zn. The dopant is introduced to replace Si atoms with a molar percentage that may preferably reach 10% and even more preferably up to 5%.

The extracting means may be on the lamination side, closer to the guiding substrate than the protective coating.

In one embodiment, the porous silica layer partially covers the guiding glass pane or the isolated substrate, thus having a first optical isolation zone additionally comprising the protective coating and the lamination interlayer, the first optical isolation zone preferably being closer to the light source than the extracting means.

And a zone, referred to as a light zone, adjacent (next) to and preferably contiguous with (abutting) the first optical isolation zone comprises the extracting means (all or some thereof) therefore lamination side.

These extracting means, in particular formed by a scattering layer, are
  directly on the guiding glass pane,
  or else further than the lamination interlayer from the guiding glass pane,
  or directly on the lamination interlayer, face that faces the guiding glass pane or guiding substrate or face opposite the guiding glass pane or guiding substrate.

Optionally, the porous silica layer is discontinuous, thus having a second optical isolation zone additionally comprising the protective coating and the lamination interlayer, the extracting zone being between the first and second optical isolation zones, in particular contiguous to the first and second optical isolation zones.

The scattering layer may be a paint, in particular a lacquer, preferably:
  on the second glass substrate laminated by the interlayer to the guiding glass pane,
  or on the lamination interlayer laminated to the second glass substrate.

The luminous zone(s) may:
  have a decorative, ambient light function (made of one or more features of different shape and/or color, that are joined together or spaced apart),
  and/or
  provide architectural lighting,
  provide directional lighting (light concentrator extracting means),
  have one or more signalling features and/or commercially oriented features (logo, etc.) of different shape and/or color, that are joined together or spaced apart.

The light extracted by the extracting feature may flash, change color by virtue of means for controlling the light source, for example an assembly of diodes emitting white light or else red, green, blue and preferably also white light.

To extract the light, scattering means are used, these means being formed for example either by a surface treatment of the glass of sandblasting, acid etching or deposition of an enamel or scattering paste type or by a treatment in the bulk of the glass of laser etching type.

The scattering extracting means are preferably in the form of a surface texturing, in particular of the first or second face, or of a scattering layer, in particular an enamel, a paint, an ink (white preferably or other depending on the zones or on the requirements) or else a (removable) scattering sticker.

The extracting means form a light concentrator (directed light emission) for example:
  reflecting means facing extracting means in order to reflect the extracted rays in a given direction, as described in document FR 2 989 176,
  lens as described in document WO 2005/018283,
  first glass substrate bevelled in particular with an acute angle of less than or equal to 45°, described in document FR 2 987 043 (in particular example in FIG. 2) with a reflector which is a reflective and/or polished surface.

The extracting means (all or some thereof) may be on the outer face opposite the inner face rather than underneath the porous silica layer occupying substantially the entire inner face.

A(n) (intermediate) product corresponding to the luminous glazing unit according to the invention without the light-extracting means may be sold, and the end user or client may themselves produce the light-extracting means, in particular that are erasable or removable, for example via a sticker or else a suitable marker pen. These light-extracting means are preferably associated with (or are on) the main (most accessible) face of the guiding glass pane or guiding substrate opposite the main face on the lamination interlayer side or on the face opposite the face on the gas-filled space side of a double (or triple) glazing unit.

According to one characteristic, a scattering layer is white, in particular a paint or an enamel, having a lightness $L^*$ of at least 50, and is part of or forms the extracting means on the opposite side from the lamination interlayer or on the side of the lamination interlayer in a zone free of optical isolator. The color is defined in a known way by the $L^*$, $a^*$ and $b^*$ parameters and is measured by a spectrocolorimeter.

In the case of a scattering layer on the lamination side, the porous silica layer may be deposited solely adjacent to and even contiguous with the scattering layer (on either side) or indeed may also cover the scattering layer or even a frosted zone.

The scattering layer, which is on the lamination side, preferably has a diffuse reflection factor of greater than or equal to 50%, or even greater than or equal to 80%.

The scattering layer, which is on the side opposite the lamination, preferably has a diffuse transmission factor of greater than or equal to 50%, or even greater than or equal to 80%.

The scattering layer may be an assembly of scattering features referred to as a scattering array, very particularly for a luminous zone of large size that it is desired to make as uniform as possible.

As this scattering array may be formed of scattering features for example having a (mean) width from 0.2 mm to 2 mm, preferably less than 1 mm and a micron-sized thickness, for example from 5 to 10 µm. The (mean) spacing between the features may be 0.2 to 5 mm. In order to form this array, it is possible to texture a layer.

In the luminous zone(s) (on the side opposite the face with extracting means such as enamel and/or on the side of the face with extracting means such as enamel), the lighting may be of Lambertian type and not directional type, along a propagation axis of the light. Thus, the luminance has the advantage of being substantially the same regardless of the angle of observation.

Preferably, the guiding glass pane or the guiding substrate coated with extracting means, especially enamel, has a light transmission of less than 45%, or less than 40% or even less than 35%.

The, especially enamel, extracting means for example extend over the entirety of one face of the guiding glass pane or substrate, discontinuously or so as to form geometric shapes randomly arranged along curved and/or straight lines. The enamel has for example fractal geometry.

According to another characteristic, the extracting means extend discontinuously and bound dark zones, especially features of geometric shapes randomly arranged along curved and/or straight lines, especially of at least centimeter-sized length (largest dimension).

The luminous zone may cover part of the area, thus leaving at least one first dark, i.e. non-luminous, zone, which is chosen from a transparent zone (clear glass area, etc.) or a decorative zone (opaque and/or colored coating such as the first coating) or even a reflective zone, especially a mirror, for example formed by silvering, covered with a protective paint.

The mirror is for example the SGG Miralite product from SAINT GOBAIN GLASS, with a paint that protects against oxidation, the silvering of the mirror being positioned:
  on the same face as the extracting means (enamel, paint) or on an opposite face,
  on the side of the lamination.

As a variant, the mirror is based on chromium such as the SGG Mirastar product from SAINT GOBAIN GLASS, the chromium being:
  on the same face as the extracting means (enamel, paint) or on an opposite face,
  on the side of the lamination or on the outer face or exterior face.

The maximum width, the width corresponding to the smallest surface dimension of this luminous zone (of any possible shape), may preferably be less than 200 nm, or even less than or equal to 100 nm, in particular for leaving a large dark zone area. The width is constant or variable.

The luminous zone may be a peripheral zone, in particular along at least one edge, for example forming at least one band or pattern, whereas the dark zone is more central (and further from the light source).

The, especially enamel, scattering layer may be a continuous surface layer having a width of less than 200 mm, or even less than 100 mm and more preferably still less than or equal to 50 mm, or be discontinuous and formed from an assembly of thin features having a width (minimum dimension of the feature) of less than 200 mm, or even less than 100 mm and more preferably still less than or equal to 50 mm.

The scattering extracting features are for example geometric shapes: rectilinear or curved band, concentric circles, L shapes, etc. The features are identical or different, parallel to each other or not and may be separated by an identical distance or not. In one preferred embodiment, the scattering layer (all or some of the extracting means) consists of agglomerated particles in a binder, said particles having a mean diameter of between 0.3 and 2 microns, said binder being in a proportion of between 10% and 40% by volume and the particles forming aggregates the size of which is between 0.5 and 5 microns. This preferred scattering layer is particularly described in patent application WO 01/90787.

The particles may be chosen from semi-transparent particles and preferably from mineral particles such as oxides, nitrides, and carbides. The particles will preferably be chosen from the oxides of silica, of alumina, of zirconia, of titanium, of cerium, or from a mixture of at least two of these oxides. To extract the light, scattering means are used, these means being formed either by a surface treatment of the glass sheet of sandblasting, acid etching or deposition of an enamel or scattering paste type, or by a treatment in the bulk of the glass, of laser etching type.

The scattering layer (all or some of the extracting means) may be composed of elements containing particles and a binder, the binder making it possible to agglomerate the particles together. The particles may be metallic or metal oxides, the size of the particles may be between 50 nm and 1 µm, preferably the binder may be mineral in order to give heat resistance.

In one preferred embodiment, the scattering layer (all or some of the extracting means) consists of agglomerated particles in a binder, said particles having a mean diameter of between 0.3 and 2 microns, said binder being in a proportion of between 10% and 40% by volume and the particles forming aggregates the size of which is between 0.5 and 5 microns. This preferred scattering layer is particularly described in patent application WO 01/90787.

The particles may be chosen from semi-transparent particles and preferably from mineral particles such as oxides, nitrides, and carbides. The particles will preferably be chosen from the oxides of silica, of alumina, of zirconia, of titanium, of cerium, or from a mixture of at least two of these oxides.

For example, a scattering mineral layer (all or some of the extracting means) of around 10 µm is chosen.

Advantageously, a luminous zone is an enamel flat tint (therefore a solid zone as opposed to an array of discrete features of millimeter-sized dots) in particular having an at least centimeter-sized length (largest dimension).

According to one characteristic, the extracting enamel has the following composition:
  between 20% and 60% by weight of $SiO_2$,
  10% to 45% by weight of especially micron-sized refractory pigments, especially of $TiO_2$; and
  preferably no more than 20% by weight of alumina and/or zinc oxide.

The $TiO_2$ pigments make the enamel sufficiently opaque (that the enamel can be seen in the off state) and lower the $T_L$. Examples of extracting enamel compositions include the enamel called Ferro 194011 sold by FERRO, the enamel of reference AF5000 sold by JM and the enamel of reference VV30-244-1 sold by Pemco, which are very white, with a brightness higher than 20, and have a low light transmission—lower than 40%.

It may be desirable for the light only to be seen from the exterior or outer face side. In order to do this, it is possible:
  to use a reflector or an opaque element on the extracting means on the lamination side (scattering layer in particular),
  to use a reflector or an opaque element on the lamination side facing the extracting means on the exterior or outer face,
  to sufficiently increase the thickness of the scattering layer (lamination side).

It is possible to use a scattering enamel/masking enamel system according to the one-way vision process with discrete features made of enamel described in patent WO 2012/172269 or else EP 1 549 498.

By way of a light source an extracting optical fiber having an emitting side face (coupled to a primary light source that is typically a diode) may be chosen. The optical fiber called 3M™ Precision Lighting Elements from 3M is for example used.

Diodes are preferred. The diodes may be (pre)encapsulated, i.e. comprising a semiconductor chip and a package (for example made of an epoxy resin or of PMMA) encapsulating the chip and having multiple functions: scattering or focusing element, wavelength conversion. The package is shared or individual.

Advantageously, the diodes are arranged so as to inject light through the edge face of the guiding glass pane or substrate along two parallel opposite sides.

The diodes may preferably be simple semiconductor chips, for example having a size of the order of about a hundred µm or mm. Their width is preferably less than the thickness of the first glass substrate especially if not laminated on the second face side.

The diodes may optionally comprise a (temporary or permanent) protective package for protecting the chip during handling or to improve the compatibility between the materials of the chip and other materials.

The diode may especially be chosen from at least one of the following light-emitting diodes:
 a side-emitting diode, i.e. emitting parallel to (the faces of) the electrical contacts, with an emitting face located to the side relative to the carrier; and
 a diode the main emission direction of which is perpendicular or oblique relative to the emitting face of the chip.

The emission diagram of a light source (of the diodes) may be Lambertian.

Preferably, the distance between the chips and the first sheet (the first glass substrate) is less than or equal to 2 mm.

For an optical isolation taking account of skin depth, preferably:
 when $n_2$ is less than or equal to 1.3, $e_2$ is at least 600 nm;
 when $n_2$ is less than or equal to 1.25, $e_2$ is at least 500 nm;
 when $n_2$ is less than or equal to 1.2, $e_2$ is at least 400 nm;
To be certain, $e_2$ is chosen to be at least 600 nm and even at least 700 nm or at least 800 nm.

The guiding substrate or glass pane used may be any type of flat (or optionally curved) glass (the glass, when it is a question of coating curved surfaces, being bent by bending processes known to those skilled in the art). It may be a question of monolithic glass panes, i.e. panes composed of a single sheet of mineral glass, which may be produced by the float process, allowing a perfectly flat and smooth sheet to be obtained, or by drawing or rolling processes.

By way of examples of glazing materials, mention may be made of float glass, optionally chemically or thermally hardened or tempered, having a conventional soda-lime composition, an aluminum borosilicate, sodium borosilicate or any other composition.

The glass of the guiding substrate or glass pane may be clear or extra-clear, containing a very low content of iron oxide(s). It may for example be a question of the glass panes sold in the "DIAMANT" range by SAINT-GOBAIN GLASS.

The substrate of the guiding substrate or glass pane may be a glazing unit made of soda-lime-silica glass, in particular that is extra-clear, and may have:
 a transmission of the light radiation of greater than or equal to 91%, or even greater than or equal to 92% or even 93% or 94% at 550 nm or preferably over the entire visible range;
 and/or a reflection of the light radiation of less than or equal to 7%, or even less than or equal to 4% at 550 nm or preferably over the entire visible range.

The coupling edge face may be shaped, in particular by (rounded) motor vehicle shaping or straight shaping.

The first glass substrate may be tempered and/or bent, before or even after being coated with the (sol-gel) porous silica layer and the protective coating. The first glass substrate with or without the (sol-gel) porous silica layer and the protective (preferably sol-gel) coating may have been given a heat treatment at a temperature greater than or equal to 450° C., preferably greater than or equal to 600° C., and is especially even a tempered glass pane or tempered curved glass pane.

Preferably, the first glass substrate with the sol-gel layer and the protective (preferably sol-gel) coating may have been given a heat treatment at a temperature greater than or equal to 450° C., preferably greater than or equal to 600° C., and is especially even a tempered glass pane or tempered curved glass pane.

The thickness of the first glass substrate is preferably between 2 and 19 mm, preferably at most 10 mm, in particular between 4 and 10 mm and more particularly between 5 and 9 mm, especially in a building.

The laminated glazing unit may have the following configuration:
 the edge face of the guiding glass pane comprises a marginal recess spanning the thickness where the source is housed, or the second substrate goes beyond the injection edge face of the first sheet, creating a lateral cavity of the glazing unit.

By way of examples, the luminous glazing unit is intended for:
 a building glazing unit, such as an illuminating wall panel, an illuminating window, a ceiling light, an illuminating floor or wall tile, an illuminating glazed door, an illuminating partition, an illuminating ceiling, a staircase step, a railing, a balustrade, a counter,
 a transport vehicle, such as an illuminating side window or an illuminating glazed roof or an illuminating window or a rear window, an illuminating glazed door, in particular for private transportation, such as motor vehicles or trucks, or for public transportation, such as trains, subways, tramways, buses or waterborne or airborne (aircraft) vehicles,
 road or urban lighting,
 a glazing unit of street furniture, such as an illuminating glazed part of a bus shelter, balustrade, display case, store window, shelf, greenhouse,
 a glazing unit for interior furniture, such as an illuminating bathroom wall, an illuminating mirror, an illuminating glazed part of a piece of furniture,
 a glazed part, in particular door, a glass shelf, cover of domestic or professional refrigerated equipment.

Another subject of the invention is a partition, in particular a laminated partition, door (framed or unframed, in particular laminated), window in particular double or triple glazed window, shelf or door (in particular double glazed door) of domestic or professional refrigerated equipment, furniture glazing, especially cupboard door, ceiling, railing, wall panel, wall tiling, staircase step, mirror, counter or store window incorporating a luminous glazing unit according to the invention.

The partition may be fixed or in the form of sliding panels, for example mounted on rails. The door may be an internal or external door or else a shower door.

For lighting of a partition, shelf, store window or premises of a company, the geometric shape of the combination of the enamel and of the transparent glazed surface will advantageously correspond to the company's logo.

In a vehicle, the extraction/conversion of the radiation (and also the type and/or the position and/or the number of the diodes) is adjusted for:
 ambient lighting, light for reading, in particular visible inside the vehicle,
 a luminous sign in particular visible outside:
  by remote activation: detection of the vehicle in a parking lot or elsewhere, door (un)locking indicator, or
  safety signal, for example such as rear brake lights,
 a substantially uniform lighting over the entire extraction surface (one or more extraction zones, common or separate functions).

The light may be:
continuous and/or intermittent,
monochromatic and/or polychromatic.

Visible inside the vehicle, it may thus have a nighttime lighting function or display function for displaying all kinds of information, of design, logo, alphanumeric sign or other signage type.

As decorative features, it is possible to form for example one or more luminous bands, or a peripheral luminous frame.

A single extraction face (preferably inside the vehicle) may be produced.

The insertion of diodes into these glazing units makes the following other signaling functionalities possible:
  display of indicator lights intended for the driver of the vehicle or the passengers (for example an engine temperature warning light displayed on the motor vehicle windshield, an indicator showing that the electrical deicing system, windows, etc. are in operation),
  display of indicator lights intended for people outside the vehicle (for example an indicator showing that the vehicle alarm in the side windows is in operation),
  luminous display on the vehicle windows (for example a flashing luminous display on emergency vehicles, a security display with low power consumption indicating the presence of a vehicle in danger).

The glazing unit may comprise a diode that can receive control signals, especially in the infrared, for remotely controlling the diodes.

The glazing unit is intended to equip any vehicle:
  side window of a land-based vehicle, in particular motor vehicle, utility vehicle, truck or train, in particular with the functional element that is a part for holding a window regulator system or with the hood trim,
  mobile or fixed roof of a land-based vehicle, in particular motor vehicle, utility vehicle, truck or train, with a first optionally rounded sheet, in particular a laminated glazing unit,
  windshield of a land-based vehicle, in particular motor vehicle, utility vehicle, truck or train, in particular with the luminous zone(s) (forming an "HUD" signal for example), in the enamel border or in proximity thereto, or rear window in particular in the enamel border or in proximity thereto,
  porthole or windshield of an airborne vehicle,
  windowpanes or roof of a waterborne vehicle, boat, submarine,
  double or triple glazing unit in a train or bus.

The glazing unit comprises an element for masking the source and possible stray light (in particular on the face opposite the extraction face, in proximity to the coupling zone), and/or for masking the attachment of the glazing unit to the body of the vehicle via the second face, it being possible for the masking element to be:
  the (sufficiently opaque black) polymer encapsulation,
  a sufficiently opaque enamel, on the periphery of the second face and/or on the first face,
  and/or a reflective surface (layer, etc.) on the periphery of the bonding face and/or on the inner face.

As already seen, the luminous glazing unit, in particular of a vehicle, may comprise a polymer encapsulation, in particular having a thickness from 0.5 mm, better 2 mm to several cm, obtained by overmolding and preferably between the encapsulation and the glazing unit, in particular made of mineral glass, a one-, two- or three-component primer layer, for example based on polyurethane, polyester, polyvinyl acetate, isocyanate.

In vehicle applications, the encapsulation material is generally gray or black (for esthetic and/or masking purposes). The encapsulation may be made of polyurethane, in particular made of PU-RIM (polyurethane reaction injection molding). Other overmolding materials are:
  flexible thermoplastics:
    thermoplastic elastomers (TPEs), in particular compounds based on styrene-ethylene/butadiene-styrene SEBS/polypropylene (PP), thermoplastic polyurethane TPU, polypropylene PP/EPDM,
    polyvinyl chloride (PVC), ethylene-propylene diene terpolymer (EPDM),
  rigid thermoplastics:
    polycarbonate (PC), polymethyl methacrylate (PMMA), polyethylene (PE), polypropylene (PP), polyamide (PA66), acrylonitrile butadiene styrene (ABS), and ABS-PC blends thereof, polystyrene (PS), acrylonitrile styrene acrylate (ASA).

The overmolding material may be colored, filled with glass fibers.

The one-, two- or three-component primer layer is for example based on polyurethane, polyester, polyvinyl acetate, isocyanate, etc., for example having a thickness from 5 to 50 µm or more, between the encapsulation and the glazing unit, in particular made of mineral glass, since this layer promotes adhesion to mineral glass.

The overmolding also provides a good esthetic finish and allows other elements or functions to be incorporated:
  overmolding of frames,
  reinforcing inserts or inserts for attaching the glazing unit, especially for opening glazing units,
  a multi-(two-, three-, etc.) lipped sealing strip, that is compressed after fitting to the body,
  trim.

Tubing, in other words a closed-cell sealing strip, may also be joined to the overmolded element.

Preferably for a roof, encapsulation is produced flush, that is to say contiguous with one of the faces of the luminous glazing unit, such as the outer face (F1).

The encapsulation may be single-sided (on one face of the guiding glass pane or substrate) or double-sided also on the edge face and even triple-sided (on the face opposite the bonding or lamination face).

Alternatively, the vehicle glazing unit comprises a prefitted polymer seal, preferably made of an elastomer, in particular made of TPE (thermoplastic elastomer) or EPDM. The seal may be adhesive-coated for the retention thereof. The seal may preferably be held simply by pinching or by fitting or by clip fastening (two half-frames for example). The seal may be single-sided, double-sided or triple-sided. The seal may form a frame. The seal may be of any shape: L-shaped, U-shaped, etc. The seal may be able to be removed at any moment. It may comprise one or more lips placed under stress after attachment.

Naturally, the invention also relates to a vehicle incorporating the glazing unit defined above.

Moreover, the invention also relates to a process for manufacturing the luminous glazing unit as described above comprising the following successive steps:
  (1) on the face of a glass substrate (guiding glass pane or guiding substrate) the application as a first layer of a first precursor sol of the material constituting the silica layer of the optical isolator, doped or undoped, in particular a hydrolyzable compound such as a silicon halide or alkoxide, in a first solvent, in particular aqueous and/or alcoholic solvent, mixed with a solid polymer pore-forming agent in the form of particles in particular in aqueous suspension, the particles preferably having a size (smallest and/or largest characteristic dimension) of greater than or equal to 50 nm, in particular between 75 and 100 nm (limits included preferably), and preferably less than 200 nm, better less than 130 nm, (2) a drying of the layer, referred to as dried layer, preferably at room temperature or a temperature of at most 110° C., preferably having a duration of at most 1 h, in particular eliminating the solvent, (3) on the dried layer, the application as a second layer of a second precursor sol of the material constituting the silica layer forming the protective coating, doped or undoped, in particular a hydrolyzable compound such as a silicon halide or alkoxide, in a second solvent, in particular aqueous and/or alcoholic solvent, (4) a heat treatment at at least 450° C., in particular for simultaneous densification of the first and second layers and removal of the pore-forming agent, preferably first heat treatment (or first heat treatment of more than 200° C.), (5) cooling, preferably to room temperature, optionally slowly in order to avoid as much as possible the risk of cracks, (in particular separate from a tempering operation), (6) application of the first lamination interlayer made of thermoplastic material to the protective coating, (7) application of an additional, organic or mineral glass substrate (said other glass substrate, said second glass substrate), (8) a lamination heat cycle.

The deposition (1) and/or (3) on the substrate may be carried out by spraying, by immersion and drawing from the silica sol (or dip coating), by spin coating, by flow coating or by roll coating.

It is thus possible to choose silica produced from tetraethoxysilane (TEOS), sodium, lithium or potassium silicate, or hybrid materials obtained from organosilane precursors, the general formula of which is:

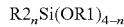

$R2_n Si(OR1)_{4-n}$ with n being an integer between 0 and 2, R1 an alkyl function of $C_xH_{2x+1}$ type, R2 an organic group comprising for example an alkyl, epoxy, acrylate, methacrylate, amine, phenyl or vinyl function. These hybrid compounds may be used as mixtures or alone, in solution in water or in a water/alcohol mixture at a suitable pH.

As a hybrid layer, it is possible to choose a layer based on methyltriethoxysilane (MTEOS), an organosilane having a non-reactive organic group. MTEOS is an organosilane which has three hydrolyzable groups and the organic part of which is a non-reactive methyl.

Preferably, the second sol is MTEOS/TEOS in an alcohol base, preferably in an isopropanol, in particular when the targeted thickness e3 is less than 300 nm for optimum wetting, better than with an aqueous solvent, and even the first sol is TEOS in an aqueous solvent and the polymer particles in aqueous suspension.

When the second sol is MTEOS/TEOS in an ethanol solvent, it is preferred to limit the thickness e3 to around 120 nm, even to 100 nm.

However, there is more choice for the second sol if e3 is at least 300 nm and better still at least 400 nm, for example MTEOS/TEOS in an aqueous base, in particular in an acid (HCl) solution, for example at pH 2.

The heat treatment may take place at at least 500° C., or even at at least 600° C. for a duration of less than or equal to 15 minutes, preferably less than or equal to 5 minutes, and it may be followed by a tempering and/or a bending/shaping operation.

This is because the two silica layers have the ability to withstand heat treatments at high temperature without cracking and without notable impairment of its optical properties and of its durability.

The heat treatment at at least 600° C. for a duration of less than or equal to 5 minutes, in particular a bending/shaping treatment, may be followed by a tempering operation.

The heat treatment may be a bending/shaping treatment between 650° C. and 670° C. followed by a tempering operation.

The heat treatment may be a bending/shaping treatment between 600° C. and 650° C. of between 2 and 4 min (without subsequent tempering).

It is preferred that the heat treatment and/or the cooling are not too abrupt in order to prevent the risks of cracks in the layers. It is preferred that the material of the pore-forming agent be removed before everything is consolidated and densified.

The refractive index of the porous silica layer can be adjusted to order as a function of the pore volume. It is possible to use the following equation for calculating the index:

$n = f \cdot n_1 + (1-f) \cdot n_{pores}$ where f is the volume fraction of the material forming the layer and $n_1$ its refractive index and $n_{pores}$ is the index of the pores, generally equal to 1 if they are empty.

It is possible to choose in particular a pore-forming agent made of one of the following polymers:

polymethyl methacrylate (PMMA),
methyl(meth)acrylate/(meth)acrylic acid copolymers,
polycarbonate, polyester, polystyrene, etc. polymers,
a latex,
or a combination of several of these materials.

The solid pore-forming agent may advantageously comprise beads, preferably polymer beads, in particular of PMMA, methyl methacrylate/acrylic acid copolymer or polystyrene type. The solid pore-forming agent may be a latex, preferably an acrylic or styrene latex, stabilized in water by a surfactant, in particular an anionic surfactant.

It is entirely possible to produce a (silica) protective coating of micrometer size and preferably of at most 3 μm.

Details and advantageous features of the invention will now become clear from the following nonlimiting examples, and by way of the figures:

FIGS. 1 to 10 are schematic and partial cross-sectional views of luminous glazing units with protected optical isolator in several embodiments of the invention.

The elements are not to scale.

Examples of Luminous Glazing Units

FIG. 1 shows a partial cross-sectional view of a luminous glazing unit 100 with a protected optical isolator in a first embodiment comprising:

a first glass substrate 1, referred to as guiding glass pane, which is glazing here of rectangular shape that is flat or as a variant curved, made of clear or extra-clear soda-lime-silica glass (of around 6 mm for example for a building or of at most 3 mm for a motor vehicle), having a refractive index n1 of around 1.5 at 550 nm, a $T_L$ of at least 90%, with first and second main faces 11, 12 and a first edge face 13, a light source 4, here an assembly of light-emitting diodes (in a row) on a printed circuit board, referred to as a PCB 41, said source being optically coupled to the edge face 13, referred to as the guiding edge face, the guiding glass pane 1 guiding the light emitted by the diodes that are preferably spaced at most 2 mm apart from the guiding edge face, preferably being centred on the edge face 13 and having a width of less than the thickness of the glass pane 1, light-extracting means 6 associated with the guiding glass pane, here on the second main face 12, referred to as the outer face, which are a, preferably white, scattering layer having a lightness L* of at least 50, preferably a scattering enamel, or as a variant a frosting of the second face or else an optical concentrator or a sticker or an ink (removable means), extracting means made up of several scattering features forming a plurality of luminous zones (or one uniform luminous zone if they are close enough) or as a variant a solid, for example single and central, luminous zone.

The first main face 11, referred to as the inner face, for its part successively comprises:

a porous silica sol-gel layer 2 having a thickness e2 of 800 nm, and having a refractive index n2 at 550 nm of at most 1.35 at 550 nm, the porous silica layer 2 being a silica matrix with closed pores 20 and even open pores at the surface, in particular of substantially oval or substantially spherical shape, each having a smallest dimension of at least 30 nm and having a largest dimension of at most 120 nm, preferably between 75 nm and 100 nm, substantially covering the first face 11, having an inner surface 21 and an outer surface 22, a mineral and transparent protective coating 3 directly on the porous silica layer and covering the entire porous silica layer, which here is a sol-gel silica layer with a thickness e3 of greater than 50 nm, better still greater than 180 nm, and a refractive index n3 of at least 1.4 at 550 nm, having an inner surface 31 and an outer surface 32, a lamination interlayer 7 made of a thermoplastic material, preferably PVB (in particular for a motor vehicle), EVA or PU, which is generally submillimetric, transparent for example clear (or tinted), having an inner surface 71 and an outer surface 72, a second glass substrate 1', made of mineral glass, for example identical to the guiding glass pane with a bonding main face 11' on the lamination interlayer side and an opposite face 12'.

The bonding face 11' directly (or via an adhesion primer) bears a decorative and/or masking first coating 5, for example a continuous layer of paint and preferably a lacquer, that is colored (white and black included) preferably having a color different from the extracting means, or arranged as separate or continuous colored discrete features of one color or of different colors, for example produced by masking or by screen printing.

The guiding glass pane may be tempered by virtue of the heat treatment in order to form the sol-gel porous silica layer and the dense sol-gel silica layer. The guiding glass pane may even be curved and tempered by virtue of the heat treatment in order to form the sol-gel porous silica layer and the dense sol-gel silica layer.

The heat, in particular bending/shaping, treatment may be carried out at at least 600° C. for a duration of less than or equal to 5 minutes, for example followed by a tempering operation. For example, the heat treatment is a bending/shaping treatment between 650° C. and 670° C. followed by a tempering operation. Or for example, the heat treatment is a bending/shaping treatment between 600° C. and 650° C. of between 2 and 4 min.

The extracting enamel 6 for example has the following composition:
between 20% and 60% by weight of $SiO_2$,
10% to 45% by weight of especially micron-sized refractory pigments, including $TiO_2$, and
preferably no more than 20% by weight of alumina and/or zinc oxide.

The $TiO_2$ pigments make the enamel sufficiently opaque (that the enamel can be seen in the off state) and lower the $T_L$.

Examples of enamel compositions include the enamel called Ferro 194011 sold by FERRO, the enamel of reference AF5000 sold by JM and the enamel of reference W30-244-1 sold by Pemco.

The enamel here is screen printed, or as a variant printed. It may be envisaged that the heat treatment used to produce the sol-gel layers serves to fire the enamel.

The extracting means may form a plurality of luminous features, for example as wide peripheral bands and/or more discrete, in particular geometric features. The luminous features form a decoration, a signage, a logo or a trademark. The lighting may be continuous or flashing and/or of variable color.

Other diodes may be added to the opposite edge face (not shown here) especially in the case of a glazing pane of large size and/or with a plurality of separate centimeter-sized features.

In order to see the continuous background of lacquer 5 (or enamel or other paint) on face 12 side, it may be desirable for the luminous zone not to be distributed substantially over the entire glazing unit (preventing extraction over the entire face bearing extracting means, here face 12).

As a variant, the scattering layer may be directly on the inner face 11:
underneath the porous silica layer optionally with a thickness rupture or heterogeneity at each edge 63, 64 and/or the outer surface 62,
if the porous layer 2 becomes discontinuous (facing, directly) underneath the paint 5 optionally making it possible to absorb light extracted in the direction opposite the outer face.

The face 12' opposite the bonding face 11' may be a free surface of the luminous glazing unit, which is visible and even accessible (touchable).

It is also possible to have a tinted glass pane 1' especially if the lacquer 5 partially covers the glass pane 1', in one or more zones, for example peripheral zones, and/or zones that form one or more decorative features. And similarly with a clear glass area, it is possible to form a double glazing unit or even a triple glazing unit with this luminous glazing unit 100. For example, it may be desired to keep a clear glass area. The glazing unit may then be part of a double glazing unit (or of a triple glazing unit) such as an insulating glazing unit for example on the face 12' side, assembled with another glazing unit spaced apart by a first gas-filled space. Added between these glazing units, at the periphery, are a first polymer seal as a frame and an interlayer that forms a spacer. Usually, the interlayer is fastened by its lateral faces by butyl rubber which also has the role of rendering the interior of the insulating glazing unit leaktight to water vapor. The interlayer is positioned set back inside the glazing unit and close to the longitudinal edges of the edge faces of the glazing units, so as to make a peripheral groove into which the first polymer seal of sealant type, for instance made of polysulfide or polyurethane, is injected. The sealant confirms the mechanical assembly of the two glazing units and ensures leaktightness to liquid water or to solvents.

After installation of the luminous glazing unit 100, this free surface 12' may be facing a glazed side of a building (wall, partition, ceiling, roof) or even of a vehicle.

After installation of the luminous glazing unit, this free surface may be facing an opaque side of a building (wall, partition, ceiling, roof) or even of a vehicle.

The luminous glazing unit 100 forms for example a partition, a ceiling, a floor, a decorative wall panel.

The second substrate 1' coated with lacquer 5 may be the product Planilaque or Décolaque from the Applicant, with a large range of (hot, cold metallized) available tints.

It is even possible to insert an electrically controllable system having variable optical properties, namely the following sequence, between the protective coating and the second glass substrate 1': said first PVB or EVA interlayer 7/first transparent electrode support such as PET/first transparent electrode in particular ITO or silver multilayer/layer of liquid crystals/second transparent electrode in particular ITO or silver multilayer/second transparent electrode support such as PET/second PVB or EVA. In the off state, the system is opaque and in the on state the system is transparent and reveals the first coating 5.

Figure 2:
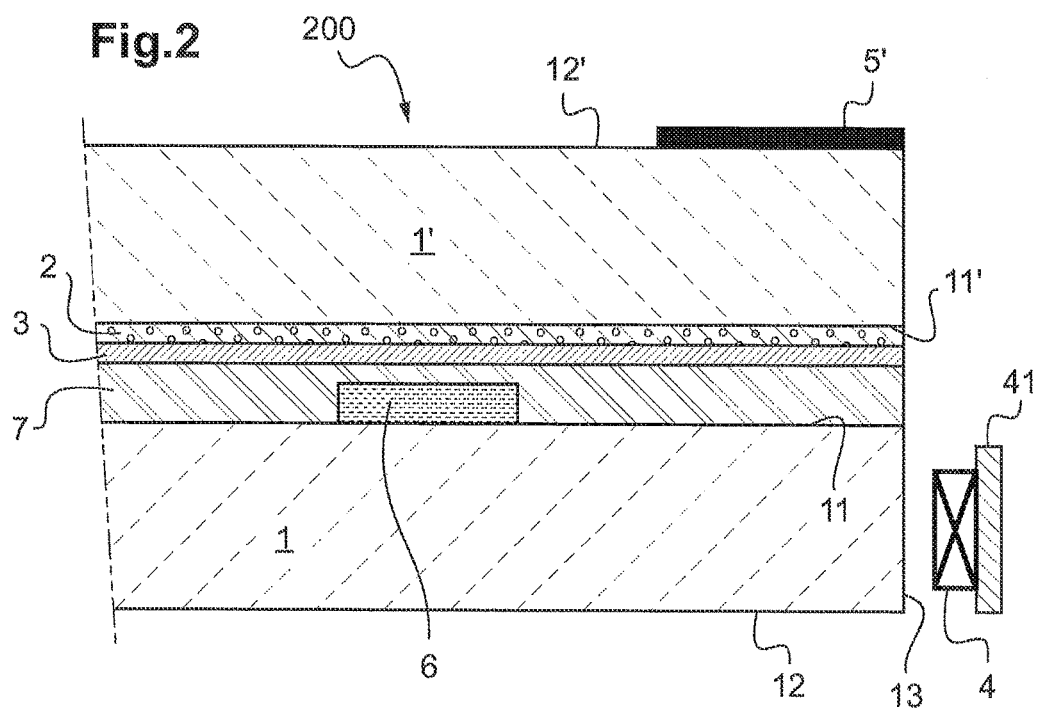

FIG. 2 shows a partial cross-sectional view of a luminous glazing unit 200 with a protected optical isolator in a second embodiment comprising:
- a glass substrate 1, referred to as guiding substrate, which is a glazing here of rectangular shape that is flat or as a variant curved, made of clear or extra-clear soda-lime-silica glass (of around 6 mm for example for a building or of at most 3 mm for a motor vehicle), having a refractive index n1 of around 1.5 at 550 nm, a $T_L$ of at least 90%, with a first main face 11, referred to as a linking face, and an opposite second main face 12, referred to as an exterior face, and a first edge face 13,
- a light source 4, here an assembly of light-emitting diodes on a printed circuit board, referred to as a PCB 41, said source being optically coupled to the edge face 13, referred to as the guiding edge face of the guiding substrate, the guiding substrate guiding the light emitted by the diodes that are preferably spaced at most 2 mm apart from the guiding edge face, preferably being centred on the edge face and having a width of less than the thickness of the glass pane 1,
- light-extracting means 6 associated with the guiding substrate here on the linking face 11 underneath the interlayer 7, which are a, preferably white, scattering layer having a lightness L* of at least 50, preferably a scattering enamel, or as a variant an optical concentrator, extracting means made of a solid, for example single and central, luminous zone or as a variant of several scattering features forming a plurality of luminous zones (or one uniform luminous zone if they are close enough), or alternatively on the face 12 for example an enamel layer or a (removable) sticker or erasable felt tip pen,
- a lamination interlayer 7 made of thermoplastic material, preferably PVB, EVA or PU, which is generally sub-millimetric, transparent for example clear, extra-clear, having an inner surface 71 and an outer surface 72, as a variant bearing extracting means (locally), or integrating extracting means (scattering particles, etc.),
- another glass substrate 1', made of mineral glass, for example identical to the guiding glass pane with a lamination main face 11' on the lamination interlayer side and an opposite face 12'.

As a variant, the guiding substrate 1 is made of organic glass, for example PC (preferably with PU lamination interlayer 7) or PMMA (preferably with PVB lamination interlayer 7).

The lamination face 11' successively comprises:
- a porous silica sol-gel layer 2 having a thickness e2 of 800 nm, and having a refractive index n2 at 550 nm of at most 1.35 at 550 nm, the porous silica layer 2 being a silica matrix with closed pores 20 and open pores at the surface, in particular of substantially oval or substantially spherical shape, each having a smallest dimension of at least 30 nm and having a largest dimension of at most 120 nm, preferably between 75 nm and 100 nm, substantially covering the face 11', having an inner surface and an outer surface,
- a mineral and transparent protective coating 3 directly on the porous silica layer and covering the entire porous silica layer, which here is a sol-gel silica layer with a thickness e3 of greater than 50 nm, better still greater than 180 nm, and a refractive index n3 of at least 1.4 at 550 nm, having an inner surface and an outer surface, The other glass substrate 1' is described as an (optically) isolated substrate.

The face opposite the lamination face 11' directly (or via an adhesion primer) bears a decorative and/or masking first coating 5', for example an enamel (better if mineral glass 1') or a paint, for example manufactured by masking or by screen printing, as a feature at the periphery and/or even elsewhere (central zone, etc.).

The first decorative and/or masking coating may be used on a portion of its length in particular for masking (absorbing) stray light directly leaving the diodes at large angles.

Depending on the requirements, the glass 1' may be tinted.

The isolated substrate 1' coated with lacquer 5 may be the product Planilaque or Décolaque (aqueous-based paint) from the Applicant, with a large range of (hot, cold metallized) available tints. The isolated substrate may be tempered and/or covered with film for the protection thereof (on the lacquer). The face 12' with the lacquer may be printed and coated with lacquer and/or textured for an adjacent frosting, contiguous with the lacquer.

The isolated substrate 1' may be tempered by virtue of the heat treatment in order to form the sol-gel porous silica layer and the dense sol-gel silica layer. The glazing unit may also be curved and tempered by virtue of the heat treatment in order to form the sol-gel porous silica layer and the dense sol-gel silica layer.

The heat, in particular bending/shaping, treatment may be carried out at at least 600° C. for a duration of less than or equal to 5 minutes, for example followed by a tempering operation. For example, the heat treatment is a bending/shaping treatment between 650° C. and 670° C. followed by a tempering operation. Or for example, the heat treatment is a bending/shaping treatment between 600° C. and 650° C. of between 2 and 4 min.

The extracting enamel 6 for example has the following composition:
- between 20% and 60% by weight of $SiO_2$,
- 10% to 45% by weight of especially micron-sized refractory pigments, including $TiO_2$, and
- preferably no more than 20% by weight of alumina and/or zinc oxide.

The $TiO_2$ pigments make the enamel sufficiently opaque (that the enamel can be seen in the off state) and lower the $T_L$.

Examples of enamel compositions include the enamel called Ferro 194011 sold by FERRO, the enamel of reference AF5000 sold by JM and the enamel of reference VV30-244-1 sold by Pemco.

The enamel here is screen printed, or as a variant printed.

The extracting means may form a plurality of luminous features, for example as wide peripheral bands and/or more discrete, in particular geometric features. The luminous features form a decoration, signage, logo or trademark. The lighting may be continuous or flashing and/or of variable color.

Other diodes may be added to the opposite edge face (not shown here) especially in the case of a glazing pane of large size and/or with a plurality of separate centimeter-sized features.

The face 12' opposite the lamination face 11' may be a free surface of the monolithic luminous glazing unit, is visible and may even be accessible (touchable).

After installation of the luminous glazing unit, this free surface may be facing a glazed side of a building (wall, partition, ceiling, roof) or even of a vehicle.

After installation of the monolithic luminous glazing unit, this free surface may be facing an opaque side of a building (wall, partition, ceiling, roof) or even of a vehicle.

The luminous glazing unit 200 forms for example in order to form a partition, a ceiling, a floor, a decorative wall panel.

It is even possible to insert an electrically controllable system having variable optical properties, namely the following sequence, between the face 11 and the protective coating: the first PVB or EVA 7/first transparent electrode support such as PET/first transparent electrode in particular ITO or silver multilayer/layer of liquid crystals/second transparent electrode in particular ITO or silver multilayer/second transparent electrode support such as PET/second PVB or EVA. In the off state, the system is opaque and in the on state the system is transparent.

FIG. 3 shows a partial cross-sectional view of a luminous glazing unit 300 with a protected optical isolator in a third embodiment.

Only differences relative to the first embodiment are described. The luminous glazing unit 300 differs as follows.

The porous silica sol-gel layer 2 and the protective coating 3 are discontinuous (forming first and second optical isolation zones 24, 25 separated by a discontinuity 23), leaving a zone of the inner face 11 directly in contact with the preferably clear or extra-clear lamination interlayer 7. The discontinuity may be surrounded by the optical isolator 2 (closed feature).

The extracting means 6 are formed by the paint or lacquer, chosen as white, on the bonding face 11' (or alternatively a preferably white enamel), forming a continuous, for example decorative, background.

Alternatively, on the bonding face 11', the lacquer is white in the zone facing the discontinuity and elsewhere there are one or more colored, for example brightly colored, zones.

Alternatively, the face 71 on the bonding face side or on the inner face 72 side of the lamination interlayer 7 comprises a scattering layer, which is for example a PVB that is printed, preferably locally.

The protective coating 2 made of a sol-gel silica layer having an index of around 1.45 may remain a solid layer covering substantially the inner face 11 in the discontinuity 23.

FIG. 4 shows a partial cross-sectional view of a luminous glazing unit 400 with a protected optical isolator in a fourth embodiment.

Only differences relative to the second embodiment are described. The luminous glazing unit 400 differs as follows.

The isolated substrate 1' comprises, on its face 12' opposite the lamination face 11', a tinted element 5, for example a tinted PET bonded by an optical adhesive or by a lamination interlayer (PVB, etc.), in particular that is clear or extra-clear. This tinted element covers (here entirely) the face 12'.

The extracting means 6 may be moved on the exterior face 12 side opposite the linking face 11, for example they may be removable.

FIG. 5 shows a partial cross-sectional view of a luminous glazing unit 500 with a protected optical isolator in a fifth embodiment.

Only differences relative to the first embodiment are described. The luminous glazing unit 500 differs as follows.

As a replacement for (or as a variant in addition to) the decorative paint 5, an electrically controllable system having variable optical properties 52, namely the following sequence, is inserted between the protective coating 3 and the bonding face 11':
the first interlayer 7 (PVB or EVA)/a first transparent electrode support 81 such as PET/first transparent electrode 82 in particular ITO or silver multilayer/layer based on liquid crystals 83/second transparent electrode 83 in particular ITO or silver multilayer/second transparent electrode support 85 such as PET/second PVB or EVA 7'.

In the off state, the system is opaque and in the on state the system is transparent.

The second glass pane 1' is for example tinted.

It is possible to add diodes to the opposite edge face (not shown).

FIG. 6 shows a partial cross-sectional view of a luminous glazing unit 600 with a protected optical isolator in a sixth embodiment.

Only differences relative to the second embodiment are described. The luminous glazing unit 600 differs as follows.

The decorative and/or masking first coating is replaced by a silvering-based mirror layer 50 with a protective overlay or a chromium-based two-way mirror. An illuminating mirror is therefore formed. Preferably, the mirror zone is at least central (if partial mirror on the face 12') and the luminous zone or zones 6 are more peripheral (solid bands, discontinuous bands based on discrete features, etc.).

It is possible to add diodes to the opposite edge face (not shown).

FIG. 7 shows a partial cross-sectional view of a luminous glazing unit 700 with a protected optical isolator in a seventh embodiment.

Only differences relative to the third embodiment are described. The luminous glazing unit 700 differs as follows.

The second glass substrate 1' is made of organic glass, for example a tinted PET 1'. The inner face of the lamination interlayer 7 comprises a scattering layer 6 directly on this face (or as a variant on the protective coating 3 present in the zone 23, or in contact with 1', or deposited on the face 11 or on the preferably clear interlayer 7 on the face 11' side), which is for example a PVB that is printed, preferably locally.

For example, a cupboard door is thus formed.

FIG. 8 shows a partial cross-sectional view of a luminous glazing unit 800 with a protected optical isolator in an eighth embodiment.

Only differences relative to the third embodiment are described. The luminous glazing unit 800 differs as follows.

For example, via selective deposition, via (enamel, etc.) screen printing, the extracting means 6, in particular scattering layer, are or is formed directly on the inner face 11 or on the protective coating 3 present as a variant in the zone 23. The lamination interlayer 7 covers the extracting enamel 6 and is laminated to a second tinted (PET) and/or scattering organic glass substrate 51'.

FIG. 9 shows a partial cross-sectional view of a luminous glazing unit 900 with a protected optical isolator in a ninth embodiment.

Only differences relative to the second embodiment are described. The luminous glazing unit 900 differs as follows.

The guiding substrate 1 has a local longitudinal recess in the coupling edge face 13 in order to house the diodes 4 which have an emitting face located to the side. Adhesive 9' on the rear face of the PCB 41 is used to attach the PCB 41+diodes 4 assembly to the lamination face 11'.

The face 12' opposite the bonding face 11' is for example completely frosted 120 or partially frosted, such as the Satinovo glass from the Applicant.

This luminous glazing unit 900 is used for example in buildings as a partition.

As a variant, the layer 6, which is for example removable, may be on the face 12.

FIG. 10 shows a partial cross-sectional view of a luminous glazing unit 1000 with a protected optical isolator in a tenth embodiment.

Only differences relative to the ninth embodiment are described. The luminous glazing unit 1000 differs as follows.

The optical isolator 2 and the protective coating 3 are on the guiding glass pane 1.

The guiding glass pane 1 is approximately 2 mm, especially for a vehicle application, in particular a motor vehicle roof. The luminous gazing unit has an in particular opaque encapsulation primer 91 and a conventionally black or dark polymer encapsulation preferably made of PU 9, which encapsulation is of double-sided type (flush with the side opposite the bonding face 11'). The space between the emitting face 4 and the coupling edge face 13 (which is rounded, for motor vehicle type shaping) is, here, filled for example with optical adhesive 9' that attaches the diodes.

An opaque coating 5' such as an enamel and/or a reflector is at the periphery of the bonding face 11' in order to promote the masking of the stray light (high-angle ray) that escapes.

The glass 1', in particular of approximately 2 mm, is preferably tinted and/or the lamination interlayer 7 is tinted (preferably PVB in particular of 0.76 mm).

Preferably, the PCB 41 is against the coating 5' (and even bonded) or directly against the face 11' (and even bonded).

The layer 6 is preferably on the face 12 ('F4' face).

Examples of Protected Optical Isolators

On a first main face of four soda-lime-silica float glass panes having a thickness of 6 mm, numbered E1 to E4, such as the Diamant glass from Saint Gobain Glass France, four protected optical isolators are formed, each in the form of a porous silica sol-gel layer having a thickness e2 approximately 800 nm thick, with approximately 18% of $SiO_2$ solids and approximately 80% porosity, having a refractive index n2 of approximately 1.15 at 550 nm, coated with a (dense) silica layer as a transparent protective coating having a refractive index n2 of approximately 1.45 at 550 nm and a thickness e3 that varies as follows:

for E1: e3 is approximately 80 nm,
for E2: e3 is approximately 130 nm,
for E3: e3 is approximately 200 nm,
for E4: e3 is approximately 250 nm.

A formulation used for all of these four examples is prepared.

A solution consisting of 12.45 ml of tetraethoxysilane (TEOS) (40% by weight) and of 17.55 ml of aqueous HCl at pH 2 is stirred for at least one hour.

Added to 26 ml of this pre-hydrolyzed TEOS solution are 15 ml of an aqueous solution of solid polymer pore-forming agents, which are BT21 latex beads (Neocryl® having a diameter of approximately 80 nm) sold by IMCD France SAS, and 9 ml of HCl at pH 2.

Each glass pane from examples E1 to E4 is covered with this liquid mixture by spin coating at a speed of 750 rpm and acceleration of 1000 rpm/s for 30 s.

Afterwards, drying is carried out for 30 min at 110° C.

This dried layer is covered with a liquid composition, the formulation of which varies for examples E1 to E4 as indicated below.

E1

Added to 10.7 g of a 28% by weight solution of tetraethoxysilane (TEOS)+methyltriethoxysilane (MTEOS) in isopropanol (IPA) (commercial solution from Evonik under the name Xenios®) are 89.3 g of IPA so as to obtain a 3% by weight concentration of TEOS+MTEOS.

This mixture was deposited on the cooled dried layer by spin coating at an acceleration of 1000 rpm/s, for 30 s, at a speed of 2000 rpm.

E2

Added to 10.7 g of a 28% by weight solution of tetraethoxysilane (TEOS)+methyltriethoxysilane (MTEOS) in isopropanol (IPA) are 89.3 g of IPA so as to obtain a 3% by weight concentration of TEOS+MTEOS.

This mixture was deposited on the cooled dried layer by spin coating at an acceleration of 1000 rpm/s, for 30 s, at a speed of 2000 rpm.

E3

Added to 21.4 g of a 28% by weight solution of tetraethoxysilane (TEOS)+methyltriethoxysilane (MTEOS) in isopropanol (IPA) are 78.6 g of IPA so as to obtain a 6% by weight concentration of TEOS+MTEOS.

This mixture was deposited on the cooled dried layer by spin coating at an acceleration of 1000 rpm/s, for 30 s, at a speed of 2000 rpm.

E4

Added to 21.4 g of a 28% by weight solution of tetraethoxysilane (TEOS)+methyltriethoxysilane (MTEOS) in isopropanol (IPA) are 78.6 g of IPA so as to obtain a 6% by weight concentration of TEOS+MTEOS.

This mixture was deposited on the cooled dried layer by spin coating at an acceleration of 1000 rpm/s, for 30 s, at a speed of 2000 rpm.

Next, each example E1 to E4 is annealed as follows: increase to 100° C. over 10 min, 100° C. for 1 h, from 100° C. to 450° C. over 3 h, 450° C. for 3 h, then cooling.

As a variant, the maximum hold is increased to 600° C. or even higher while decreasing the duration to less than 15 min, even 5 min, while optionally bending the glass, and/or even optionally carrying out a tempering operation.

Examples E1 to E3 are laminated with an EVA and a glass pane that is clear and white lacquered covering the whole of the bonding face.

The extracting means are the white scattering enamel from example 1, on the outer face.

The luminance values measured normal to examples E1 to E3 increase with the thickness e3. By comparison, in the absence of the protective silica layer, the guidance is not satisfactory.

Preferably, a thickness e3 of at least 180 nm and even of at least 300 nm or 400 nm is chosen.

A black opaque encapsulation primer is deposited on the protective coating of example E4.

The luminance value measured normal to E4 is satisfactory. By comparison, in the absence of the protective silica layer, the guidance is not satisfactory.

Preferably, a thickness e3 of at least 180 nm and even of at least 300 nm or 400 nm is chosen.

Surprisingly, if necessary a porous silica sol-gel bilayer of at least 600 nm and better 800 nm (and preferably submicronic)/micronic (at most 3 μm, even at most 2 μm) dense silica sol-gel bilayer may be produced without generating cracks.

The invention claimed is:

1. A luminous glazing unit comprising:
   a first glass substrate, made of mineral glass having a refractive index n1 of less than 1,6 at 550 nm, with first and second main faces and an edge face, and in optical contact with the first glass substrate:
      a polymer layer, selected from at least one of the following elements:
         a lamination interlayer, made of thermoplastic material, associated with a tinted and/or reflective element and/or
         an opaque polymer encapsulation or a polymer encapsulation primer underneath an opaque polymer encapsulation,
      an optical isolator directly on the first glass substrate and underneath the polymer layer, the optical isolator comprising a porous silica layer having a thickness e2 of at least 400 nm, having a refractive index n2 at 550 nm of at most 1.35 at 550 nm,
   a light source, optically coupled to the first glass substrate, the first glass substrate to guide the light emitted by the light source,
   a light-extracting device associated with the first glass substrate, and
   a mineral and transparent protective coating provided directly on the porous silica layer and directly underneath the polymer layer, the transparent protective coating comprising a silica layer with a thickness e3 of greater than 50 nm and a refractive index n3 of at least 1.4 at 550 nm.

2. The luminous glazing unit as claimed in claim 1, wherein the lamination interlayer is tinted and/or is laminated with a second tinted glass substrate, made of mineral or organic glass and/or that has a bonding face linked to the lamination interlayer and bears a tinted film on the bonding face side or on a main face side opposite the bonding face.

3. The luminous glazing unit as claimed in claim 1 wherein the lamination interlayer is laminated with a second glass substrate, made of mineral or organic glass, with a bonding face linked to the lamination interlayer, the bonding face and/or a face opposite the bonding face being coated with a decorative and/or masking layer, which is peripheral and on the side of an optical coupling, or distributed and substantially covering the bonding face and/or the opposite face.

4. The luminous glazing unit as claimed in claim 1, wherein the lamination interlayer is laminated with a second glass substrate, made of mineral or organic glass, with a bonding face linked to the lamination interlayer, wherein the bonding face or a main face opposite the bonding face comprises a scattering layer and/or said second substrate is scattering and/or else a scattering element is between the protective coating and the lamination interlayer.

5. A luminous glazing unit comprising:
   a mineral or organic first glass substrate, having a refractive index n1 of less than 1.6 at 550 nm, a second glass substrate made of mineral glass with a laminating face, the first glass substrate laminated via a linking face to the second glass substrate, via a lamination interlayer made of thermoplastic material, the second glass substrate being tinted and/or scattering and/or bearing a tinted and/or scattering and/or reflective element on a main face opposite the laminating face,
   an optical isolator directly on the laminating face and underneath the interlayer, the optical isolator comprising a porous silica layer having a thickness e2 of at least 400 nm, having a refractive index n2 at 550 nm of at most 1.35 at 550 nm,
   a light source, optically coupled to said first glass substrate, said first glass substrate to guide the light emitted by the source,
   a light-extracting device associated with the first glass substrate, and
   a mineral and transparent protective coating directly on the porous silica layer and directly underneath the lamination interlayer, the protective coating comprising a silica layer with a thickness e3 of greater than 50 nm and a refractive index n3 of at least 1.4 at 550 nm.

6. The luminous glazing unit as claimed in claim 5, wherein the extracting are device is on a lamination side, closer to the first glass substrate than the protective coating.

7. The luminous glazing unit as claimed in claim 5, wherein e3 is greater than 100 nm.

8. The luminous glazing unit as claimed in claim 5, wherein e3 is greater than 180 nm.

9. The luminous glazing unit as claimed in claim 5, wherein the porous silica layer is a silica matrix with closed pores in its volume, each having a smallest dimension of at least 30 nm and a largest dimension of at most 120 nm, the thickness e3 being greater than the largest dimension of the pores and submicronic.

10. The luminous glazing unit as claimed in claim 5, wherein the porous silica layer is a sol-gel layer and the protective coating is a sol-gel silica layer.

11. The luminous glazing unit as claimed in claim 5, wherein the porous silica layer partially covers the first glass substrate or the second glass substrate, thus having a first optical isolation zone additionally comprising the protective coating and the lamination interlayer, the first optical isolation zone being closer to the light source than the light-extracting device and wherein a luminous zone, adjacent to and contiguous with the first optical isolation zone, comprises the light-extracting device, which is formed by a scattering layer.

12. The luminous glazing unit as claimed in claim 11, wherein the scattering layer is a paint on the second glass substrate laminated by the lamination interlayer to the first glass substrate or on the lamination interlayer laminated to the second glass substrate.

13. The luminous glazing unit as claimed in claim 5, wherein a scattering layer, which is white and has a lightness L* of at least 50, is part of or forms the light-extracting device on an opposite side from the lamination interlayer or on a side of the lamination interlayer in a zone free of optical isolator.

14. The luminous glazing unit as claimed in claim 5, wherein the light-extracting device is scattering, in the form of a surface texturing, or of a scattering layer, and/or form a light concentrator.

15. The luminous glazing unit as claimed in claim 5, wherein the light source is an array of light-emitting diodes, aligned on a printed circuit board and coupled to an edge face of the first glass substrate.

16. The luminous glazing unit as claimed in claim 5, wherein an outer face of the first glass substrate opposite the linking face is coated at a periphery of the first glass substrate with a polymer encapsulation or an encapsulation primer and polymer encapsulation.

17. The luminous glazing unit as claimed in claim 5, further comprising an electrically controllable system having variable optical properties between the first glass substrate and the protective coating.

18. The luminous glazing unit as claimed in claim 5, wherein the luminous glazing unit forms a vehicle glazing unit or a building glazing unit.

19. A partition, door, window, shelf or door of domestic or professional refrigerated equipment, furniture glazing, ceiling, railing, wall panel, wall tiling, staircase step, counter, store window, mirror or vehicle glazing incorporating a luminous glazing unit as claimed in claim 5.

* * * * *